United States Patent
Moeller et al.

(10) Patent No.: US 12,052,955 B2
(45) Date of Patent: Aug. 6, 2024

(54) SYSTEM, METHOD AND APPARATUS FOR COMPUTING AND MANAGING THE FLOW RATE WITHIN AN IRRIGATION CORNER ASSEMBLY

(71) Applicant: Valmont Industries, Inc., Omaha, NE (US)

(72) Inventors: Mark A. Moeller, Valley, NE (US); Tracy A. Thatcher, Gretna, NE (US)

(73) Assignee: Valmont Industries, Inc.

(*) Notice: Subject to any disclaimer, the term of this patent is extended or adjusted under 35 U.S.C. 154(b) by 0 days.

(21) Appl. No.: 17/839,620

(22) Filed: Jun. 14, 2022

(65) Prior Publication Data

US 2022/0400632 A1 Dec. 22, 2022

Related U.S. Application Data

(60) Provisional application No. 63/213,345, filed on Jun. 22, 2021.

(51) Int. Cl.
*A01G 25/16* (2006.01)
*A01G 25/09* (2006.01)

(52) U.S. Cl.
CPC .......... *A01G 25/16* (2013.01); *A01G 25/092* (2013.01)

(58) Field of Classification Search
CPC .............................. A01G 25/16; A01G 25/092
See application file for complete search history.

(56) References Cited

U.S. PATENT DOCUMENTS

| | | | |
|---|---|---|---|
| 5,048,755 A | 9/1991 | Dodds | |
| 5,246,164 A | 9/1993 | McCann et al. | |
| 5,678,771 A | 10/1997 | Chapman | |
| 6,923,390 B1 * | 8/2005 | Barker | A01G 25/092 701/472 |
| 6,938,842 B2 | 9/2005 | Choat et al. | |
| 8,369,996 B2 * | 2/2013 | Choat | A01G 25/16 239/69 |
| 8,720,803 B1 | 5/2014 | Standley | |
| 8,739,830 B2 | 6/2014 | Bradbury et al. | |
| 8,849,468 B2 | 9/2014 | Abts et al. | |
| 2002/0066810 A1 | 6/2002 | Prandi | |
| 2002/0107582 A1 | 8/2002 | Pollak et al. | |
| 2004/0093912 A1 * | 5/2004 | Krieger | A01G 25/092 68/19 |
| 2010/0042263 A1 | 2/2010 | Jacobsen et al. | |
| 2010/0237164 A1 | 9/2010 | Noh | |
| 2012/0228395 A1 | 9/2012 | Needham et al. | |
| 2016/0368011 A1 | 12/2016 | Feldhaus et al. | |
| 2017/0156273 A1 | 6/2017 | Whalley | |
| 2018/0054982 A1 * | 3/2018 | Whalley | A01G 25/16 |
| 2019/0239457 A1 | 8/2019 | Ricketts et al. | |

* cited by examiner

*Primary Examiner* — Chad G Erdman
(74) *Attorney, Agent, or Firm* — Milligan PC LLO

(57) ABSTRACT

The present invention provides a system and method for calculating the water flow rates applied by corner arm sprinklers. According to a first embodiment, the present invention provides a system and method for controlling and balancing the flow rates of corner arm sprinklers to provide targeted discrete, controlled uniform and non-uniform water distribution rates across a given field.

18 Claims, 24 Drawing Sheets

| | Area Under Sprinkler 101<br>SLFM = 1 | Area Under Sprinkler 102<br>SLFM = 1 | Area Under Sprinkler 103<br>SLFM = 1 | External Area |
|---|---|---|---|---|
| 100 | | | | |
| 99 | 20 GPM from sprinkler 100 | 20 GPM from sprinkler 101 | 20 GPM from sprinkler 102 | 20 GPM from 103 |
| 100 | 60 GPM from sprinkler 101 | 60 GPM from sprinkler 102 | 60 GPM from sprinkler 103 | |
| 101 | 20 GPM from sprinkler 102 | 20 GPM from sprinkler 103 | | |

FIG. 17

|  | | Area 99 | Area 100 | Area 101 | Area 102 | Area 103 | Mean | Stdev |
|---|---|---|---|---|---|---|---|---|
| Init | | 100 | 100 | 100 | 100 | 100 | 100 | 0 |
| Iteration 1 | Water Flow in Area | 100 | 100 | 100 | 100 | 80 | 96 | 8.944272 |
| Iteration 1 | SLFM*100GPM | 120 | 120 | 120 | 127.1429 | 143.6842 | 126.1654 | 10.27011 |
| Iteration 2 | Water Flow in Area | 120 | 119.7176 | 121.4286 | 129.0026 | 111.6391 | 120.418 | 6.174104 |
| Iteration 2 | SLFM*100GPM | 120 | 119.3255 | 117.4746 | 124.0445 | 150.0643 | 126.2602 | 13.51596 |
| Iteration 3 | Water Flow in Area | 119.9435 | 120.2881 | 119.2372 | 127.9345 | 114.8475 | 120.2576 | 4.74901 |
| Iteration 3 | SLFM*100GPM | 120.1809 | 119.5293 | 116.6012 | 121.1245 | 153.4201 | 126.323 | 15.24741 |
| Iteration 4 | Water Flow in Area | 120.2023 | 120.8893 | 118.2432 | 126.679 | 116.2769 | 120.1862 | 3.925724 |
| Iteration 4 | SLFM*100GPM | 120.1137 | 119.8569 | 116.5029 | 118.7415 | 155.5953 | 126.3685 | 16.42294 |
| Iteration 5 | Water Flow in Area | 120.2688 | 119.8569 | 117.8279 | 125.6645 | 117.1055 | 120.1447 | 3.360479 |

FIG. 18

SYSTEM, METHOD AND APPARATUS FOR COMPUTING AND MANAGING THE FLOW RATE WITHIN AN IRRIGATION CORNER ASSEMBLY

RELATED APPLICATIONS

The present application claims priority to U.S. Provisional Application No. 63/213,345 filed Jun. 22, 2021.

BACKGROUND AND FIELD OF THE PRESENT INVENTION

Field of the Present Invention

The present invention relates generally to a system and method for irrigation management and, more particularly, to a system, method and apparatus for computing and managing the flow rates of sprinklers within an irrigation corner assembly.

Background of the Invention

An exemplary center pivot irrigation system as known in the prior art is shown in FIG. 1. As shown, irrigation machines 100 commonly include a main section assembly 104 which may include any number of interconnected spans supported by one or more intermediate drive towers 108 and a Last Regular Drive Unit ("LRDU") 110. The LRDU 110 is normally a motorized drive tower which rotates the main section assembly 104 around the center pivot 102.

To cover additional area, corner spans 106 are commonly attached at a connection point 112 which allows the corner span 106 to laterally rotate around the connection point 112. The corner span 106 as shown is supported and moved by a corner/steerable drive unit 114 (SDU). The corner span 106 may include a boom 116 and an end gun (not shown) and/or other sprayers. Additionally, position sensors between the spans may provide positional and angular orientation data for the system as discussed further below. Further, one or more control panels 120 are generally provided to enclose on-board computer elements.

In operation, corner machines 106 must be capable of moving faster than the main irrigation machine 104 to extend and thus increase the effective length of the irrigation machine, and then go slower than the main irrigation machine to retract, and therefore shorten the effective length of the irrigation machine. The SDU 114 adjusts steering angles and ground speeds to facilitate this movement.

At present, modern irrigation systems are limited in their ability to apply set targeted flow rates in an even manner across a given field. To do so, the flow rate must be directly proportional to the speed (Flow/Sprinkler Speed=Constant) across each span. In other words, when a sprinkler moves faster than another sprinkler, it must provide more water (assuming a common sprinkler type is used). Using this relationship, it is possible to calculate and balance flow rates for sprinklers on the main span 104. The same calculations, however, cannot be used to accurately calculate flow rates for corner sprinklers. This is due to the complex interplay of movements between the irrigation machine 104 and the corner machine 106. For this reason, calculating and controlling the uniform distribution of water by the corner machine 106 is often difficult and imprecise. Still further and for the same reasons, known systems are also unable to calculate and apply a targeted, non-uniform water distribution across a given area or to execute a controlled variable rate prescription that results in a defined, non-uniform application depth.

To overcome the limitations of the prior art, a system is needed which is capable of accurately calculating flow rates for corner arm sprinklers. Additionally, a system is needed which can control and balance the flow rates of corner arm sprinklers to provide discrete, controlled uniform and non-uniform distribution rates of water across a given field area irrigated by the corner machine 106.

SUMMARY OF THE PRESENT INVENTION

The present invention provides a system and method for calculating the water flow rates applied by corner arm sprinklers. According to a first embodiment, the present invention provides a system and method for controlling and balancing the flow rates of corner arm sprinklers to provide controlled uniform and non-uniformed water distribution rates across a given field.

The accompanying drawings, which are incorporated in and constitute part of the specification, illustrate various embodiments of the present invention and together with the description, serve to explain the principles of the present invention.

BRIEF DESCRIPTION OF THE DRAWINGS

FIG. 17 is a first explanatory chart for an example calculation of the SLFM according to the present invention.

FIG. 18 is a second explanatory chart for the example calculation of the SLFM according to the present invention.

DESCRIPTION OF THE PREFERRED EMBODIMENTS

Figure 1:
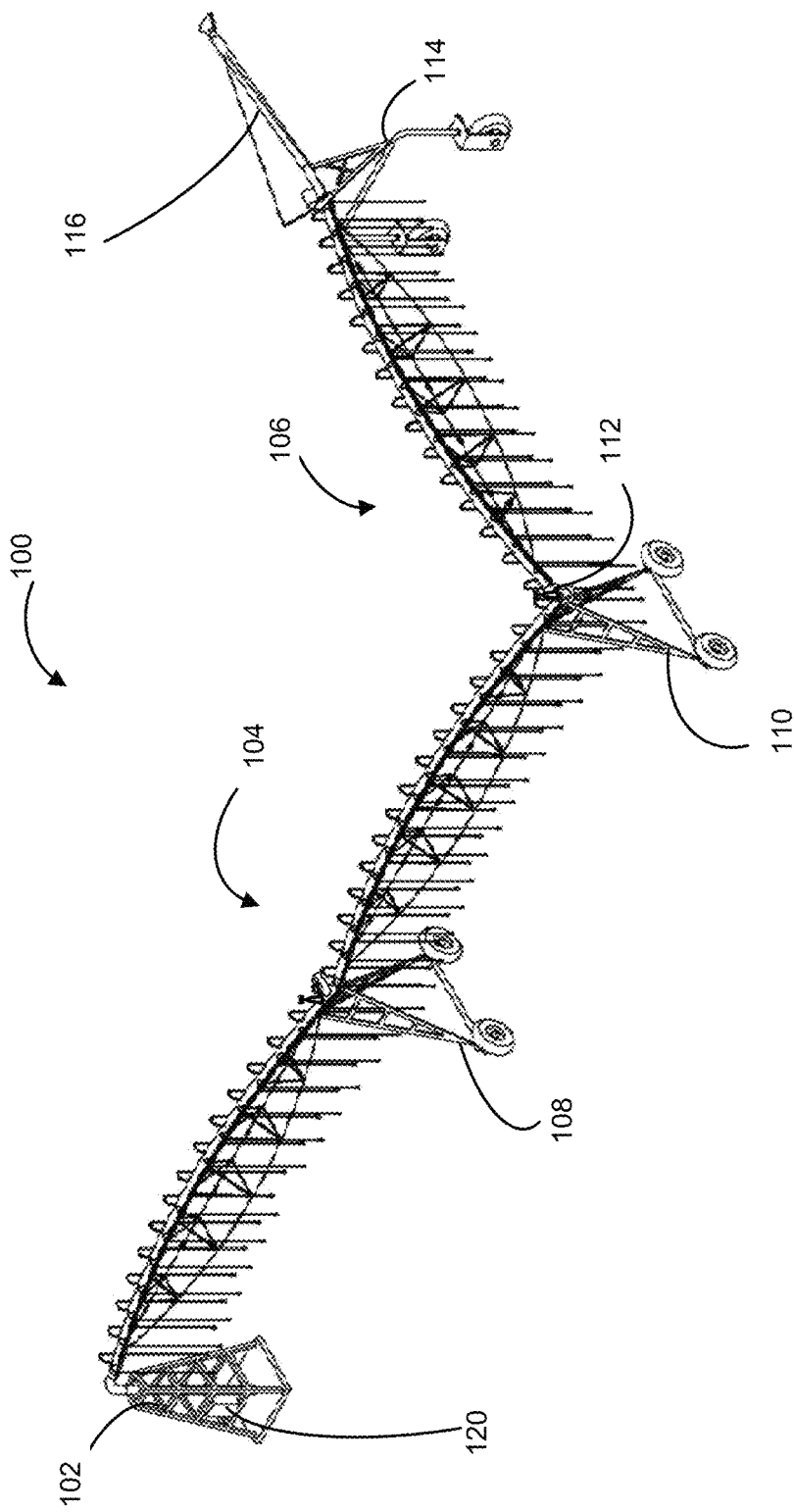
FIG. 1 shows an exemplary irrigation system as known in the prior art.

The present invention provides a system and method for controlling and balancing the flow rates of corner arm sprinklers. For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art. The descriptions, embodiments and figures used are not to be taken as limiting the scope of the claims.

Where the specification describes advantages of an embodiment or limitations of other prior art, the applicant does not intend to disclaim or disavow any potential embodiments covered by the appended claims unless the applicant specifically states that it is "hereby disclaiming or disavowing" potential claim scope. Moreover, the terms "embodiments of the invention", "embodiments" or "invention" do not require that all embodiments of the invention include the discussed feature, advantage or mode of operation, nor that it does not incorporate aspects of the prior art which are sub-optimal or disadvantageous.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Additionally, any examples or illustrations given herein are not to be regarded in any way as restrictions on, limits to, or express definitions of, any term or terms with which they are utilized. Instead, these examples or illustrations are to be regarded as illustrative only.

As used herein, the singular forms "a", "an" and "the" are intended to include the plural forms as well, unless the context clearly indicates otherwise. Additionally, the word "may" is used in a permissive sense (i.e., meaning "having the potential to"), rather than the mandatory sense (i.e., meaning "must"). Further, it should also be understood that throughout this disclosure, unless logically required to be otherwise, where a process or method is shown or described, the steps of the method may be performed in any order (i.e., repetitively, iteratively, or simultaneously) and selected steps may be omitted. It will be further understood that the terms "comprises," "comprising," "includes" and/or "including", when used herein, specify the presence of stated features, integers, steps, operations, elements, and/or components, but do not preclude the presence or addition of one or more other features, integers, steps, operations, elements, components, and/or groups thereof.

Further, many of the embodiments described herein are described in terms of sequences of actions to be performed by, for example, elements of a computing device. It should be recognized by those skilled in the art that the various sequences of actions described herein can be performed by specific circuits (e.g., application specific integrated circuits (ASICs)) and/or by program instructions executed by at least one processor to enable the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter.

The terms "program," "computer program," "software application," "module" and the like as used herein, are defined as a sequence of instructions designed for execution on a computer system. In addition, for each of the embodiments described herein, the corresponding form of any such embodiment may be described herein as, for example, "a computer configured to" perform the described action. Any such computer, program, computer program, module or software application may include a subroutine, a function, a procedure, an object implementation, an executable application, an applet, a servlet, a source code, an object code, a shared library, a dynamic load library and/or other sequence of instructions designed for execution on a computer system. A memory or data storage means, as defined herein, includes many different types of computer readable media including volatile storage such a RAM, buffers, cache memory, and network circuits.

Figure 2:
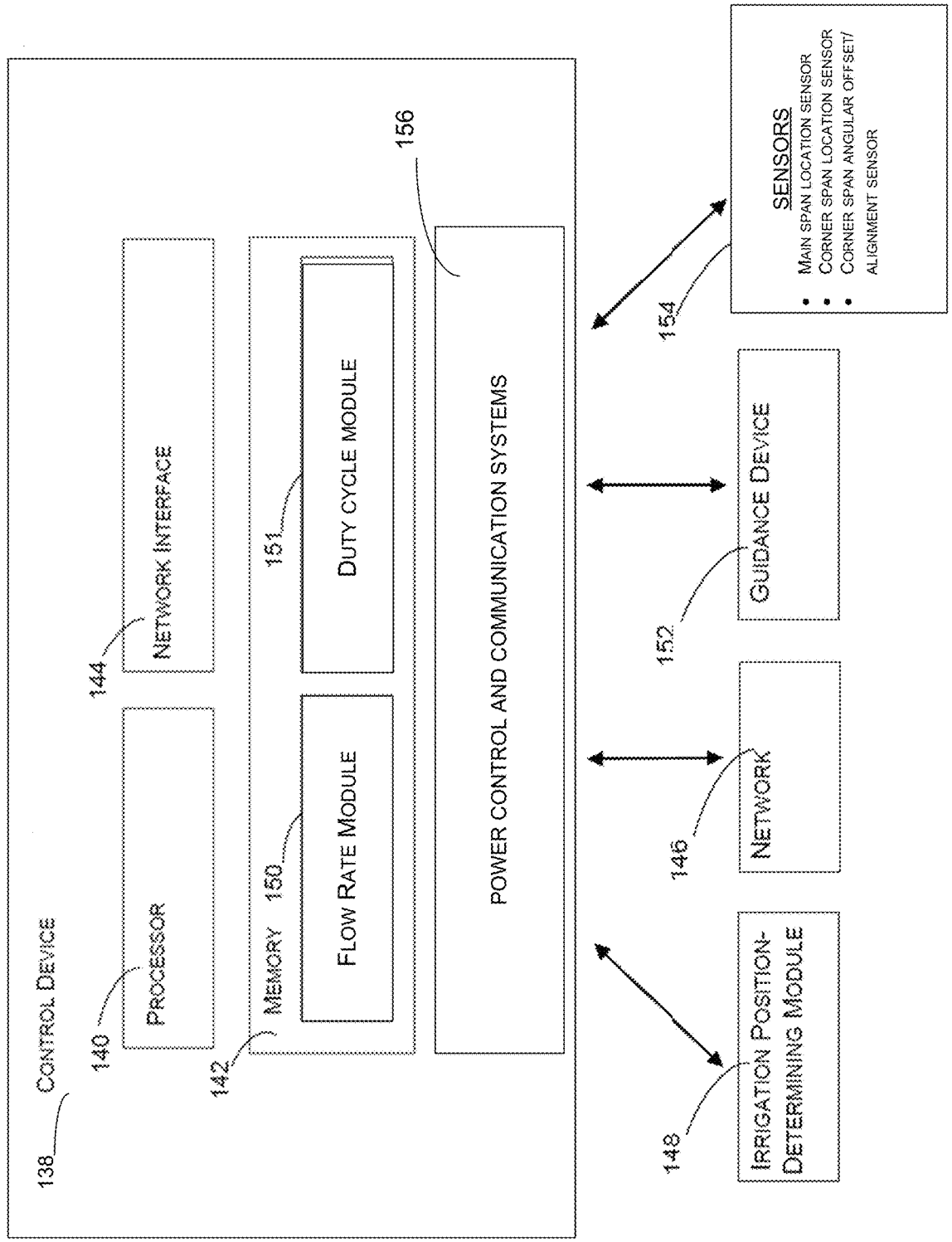
FIG. 2 shows a block diagram illustrating the exemplary processing architecture of a control device in accordance with a first preferred embodiment of the present invention.

With reference now to FIG. 2, an exemplary control device 138 which represents functionality to control one or more operational aspects of the irrigation system 100 will now be discussed. As shown, an exemplary control device 138 preferably includes a processor 140, a memory 142, one or more processing modules 150, 151 and a network interface 144. The processor 140 preferably may provide processing functionality for the control device 138 and may include any number of processors, micro-controllers, or other processing systems.

The processor 140 may further execute one or more software programs that implement techniques described herein. The memory 142 may be an example of tangible computer-readable media that provides storage functionality to store various data associated with the operation of software programs and code segments mentioned above, or other data to instruct the processor 140 and other elements of the control device 138 to perform the steps described herein. The network interface 144 preferably provides functionality to enable the control device 138 to communicate with one or more networks 146 through a variety of components such as wireless access points, transceivers and so forth, and any associated software employed by these components (e.g., drivers, configuration software, and so on).

In implementations, the irrigation position-determining module 148 may include a global positioning system (GPS) receiver or the like to calculate a location of the irrigation system 100. Further, the control device 138 may be coupled to a guidance device or similar system 152 of the irrigation system 100 (e.g., steering assembly or steering mechanism) to control movement of the irrigation system 100. The control device 138 may also include sensors systems/inputs 154 to receive data from one or more sensors, including alignment sensors between spans. Further, the control device 138 may preferably further include a power control and communications system 156 for transmitting and receiving data and control signals from elements throughout the irrigation system 100 as discussed further below.

According to a further preferred embodiment, a Flow Rate Module 150 and a Duty Cycle Module 151 may calculate and adjust the flow rates and duty cycles of individual and/or groups of sprinklers to selectively apply water (or other applicants) to discrete areas of a given field and at variable application depths while executing dynamically adjusted irrigation plans as explained in detail below. The calculated and executed variable rate prescriptions of the present invention may provide discrete, controlled uniform and non-uniform distribution rates/application depths across a single or multiple areas of a given field.

With reference now to FIGS. 3-23, the present invention teaches a system and method for controlling and computing the flow rates for corner arm sprinklers (i.e., sprinklers located between the LRDU and the SDU) to achieve defined/discrete uniform and non-uniform distribution rates. The following aspects of the present invention may be controlled and executed by the exemplary control device 138 discussed above. Alternatively, aspects of the present invention may be executed by other attached or remote processors.

Figure 3:
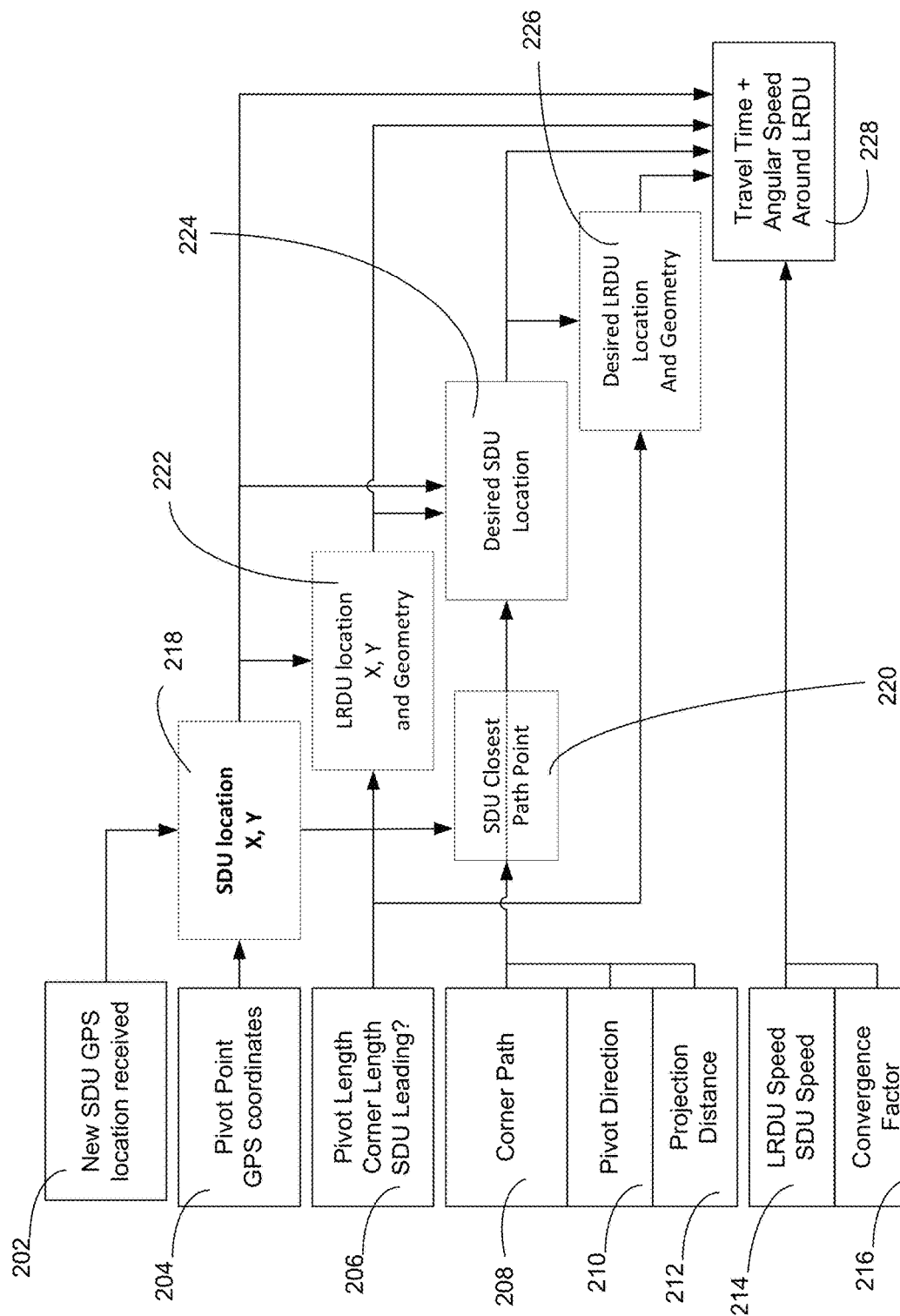
FIG. 3 is a block diagram illustrating exemplary steps of a method in accordance with a first preferred embodiment of the present invention.
Figure 4:
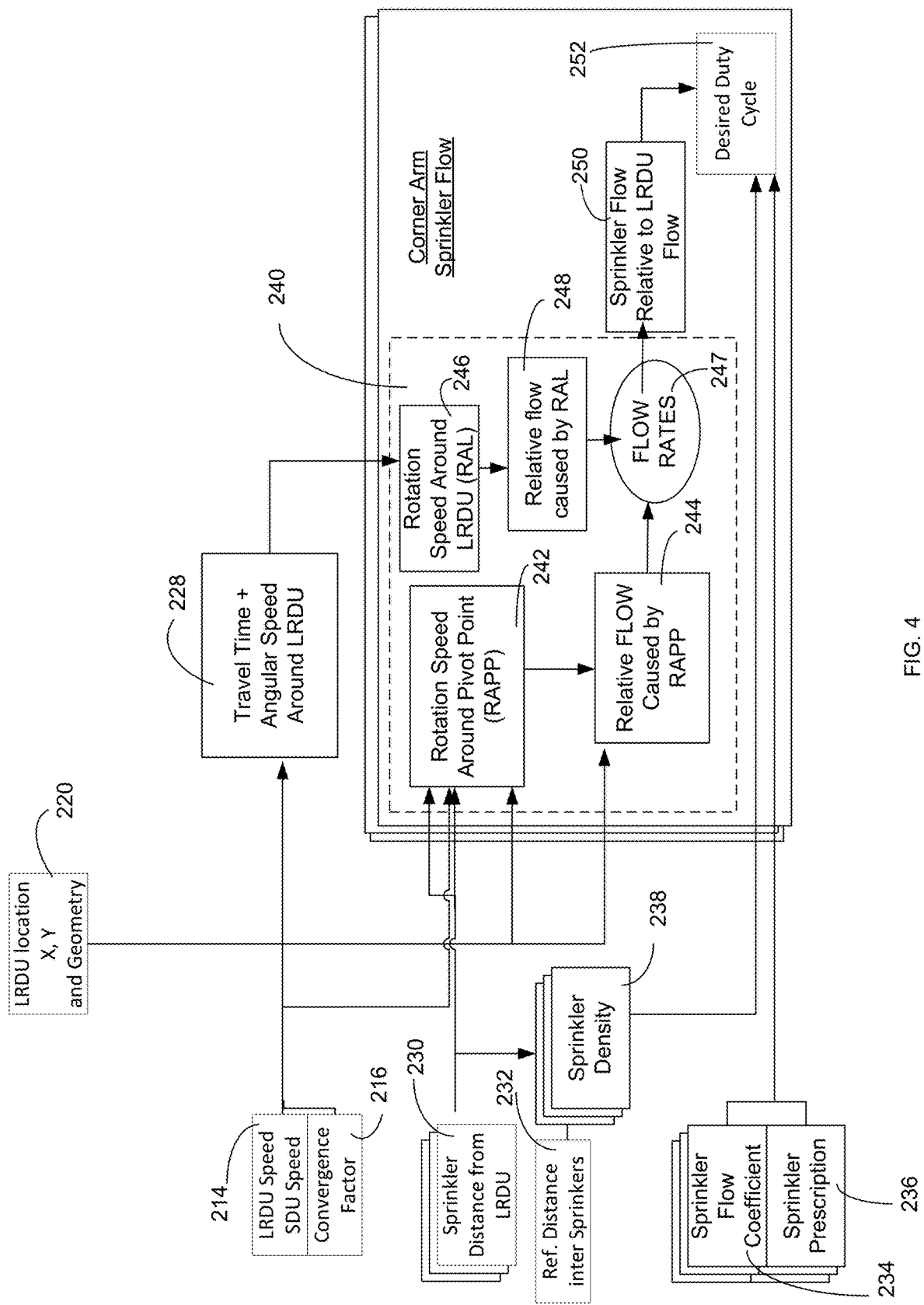
FIG. 4 is a block diagram illustrating additional exemplary steps of the method of the present invention shown in FIG. 3.

With reference now to FIG. 3, an exemplary system of the present invention preferably may include user input devices, sensors and/or stored data to provide groups of data to allow later computations to be made. For example, the present invention may receive, store and/or include data such as: SDU GPS location data 202, pivot point GPS data 204, irrigation system dimensions and SDU heading 206 (e.g., pivot length, corner length etc.); SDU/corner path data 208, pivot direction data 210, sprinkler projection distance data 212, drive tower speeds 214 (e.g., LRDU and SDU speeds), and other factors such as a Convergence Factor 216 as discussed further below.

According to preferred embodiments, the system may pre-calculate initial SDU and/or LRDU paths and generate SDU/LRDU path data for the system to execute a given irrigation prescription/program. Preferably, the system may pre-calculate the initial SDU and/or LRDU paths based on stored and/or detected factors within the area irrigated by the corner. According to a preferred embodiment, these may include factors such as: field boundary shape, keep out zones (e.g., obstacles, boundaries), must cross areas (e.g., bridges), safety margins, and irrigation machine geometry (e.g., distance to LRDU, corner arm span length, corner overhang length, speed ratio between LRDU and SDU) and other factors. As discussed further below, according to preferred methods, the system of the present invention may execute the pre-calculated SDU and/or LRDU paths based on the irrigation machine position (or the positions of individual elements). According to preferred embodiments, the system of the present invention may then further dynamically re-calculate, update and/or make adjustments to the pre-calculated SDU and/or LRDU paths as the machine moves about the field based on various detected factors as discussed with respect to FIG. 3 below.

With reference now to FIG. 3, an exemplary system and method for dynamically adjusting an initial SDU path shall now be discussed. Although not directly discussed in the example of FIG. 3, the system may also adjust an initial LRDU path separately in a similar manner either alone or in conjunction with updating the initial SDU path. As shown in FIG. 3, a system implementing the present invention may at an initial step 218 receive and/or calculate the SDU location (X, Y). According to a preferred embodiment, the SDU location may preferably be calculated as the X, Y distance of the SDU from the pivot point, in meters. Preferably, the SDU (X, Y) location may be calculated using GPS data as explained below. At a next step 220, the SDU location is preferably fixed to the closest path point for the given path of the SDU as also discussed in more detail below. At a next step 222, the LRDU (X, Y) location may preferably be calculated from the SDU Position as explained further below.

Once the relative positions of the LRDU and SDU are determined, the system may then at a next step 224 determine a target/desired SDU location. To do so, the system preferably first determines the SDU path point that is the closest to the SDU. Then, the system preferably establishes a target location (SDU') by estimating where the SDU will be on the path at a projected time/distance ahead, in the pivot direction.

At a next step 226, the system preferably next determines a target/desired LRDU location, matching the target/desired SDU location (SDU'). Step 226 may preferably use the same steps as required to determine the current LRDU location from the current SDU location (i.e., Law of Cosine) as discussed below with respect to FIG. 6 and step 220.

Referring again to FIG. 3, at a next step 228 the system preferably determines the "travel time" required for the LRDU to travel from the current LRDU position to the target/desired LRDU position (LRDU'). In addition, the system may in step 228 also calculate the angular speed of the SDU from the determined "travel time" (i.e., the angular speed required for the SDU to travel to its target position within the determined "travel time.") According to a preferred embodiment, the "travel time" may preferably be calculated as the minimum time allowed to the SDU to go from its current position to the target/desired SDU position. If the "travel time" falls below a minimum threshold of time or if the SDU distance to the target/desired SDU position exceeds a threshold distance, the system may preferably assume that the SDU will move at its maximum speed. Alternatively, the system may assume that the SDU will move towards the Desired SDU position at a modified speed which may be based on the relative speeds of the SDU and LRDU and/or the relative distances between the current and target/desired positions.

At a next step 240, the flow rates 247 for the corner arm sprinklers (i.e., the sprinklers located between the LRDU and the SDU) are calculated. Preferably, the flow of each corner sprinkler is calculated in two parts: the flow caused by the rotation around the pivot point and the flow caused by the rotation around the LRDU. These calculations are then added to provide a total flow for each corner sprinkler. At step 250, the sprinkler flows of each sprinkler relative to the LRDU flow is determined. An exemplary method of determining LRDU sprinkler flows is provided below. Thereafter at step 252, the system preferably controls the duty cycle rates of each corner sprinkler to create discrete, controlled uniform and non-uniform distribution rates as discussed in further detail below.

I. Calculating Sprinkler Flow Rates—Step 240

Figure 8:
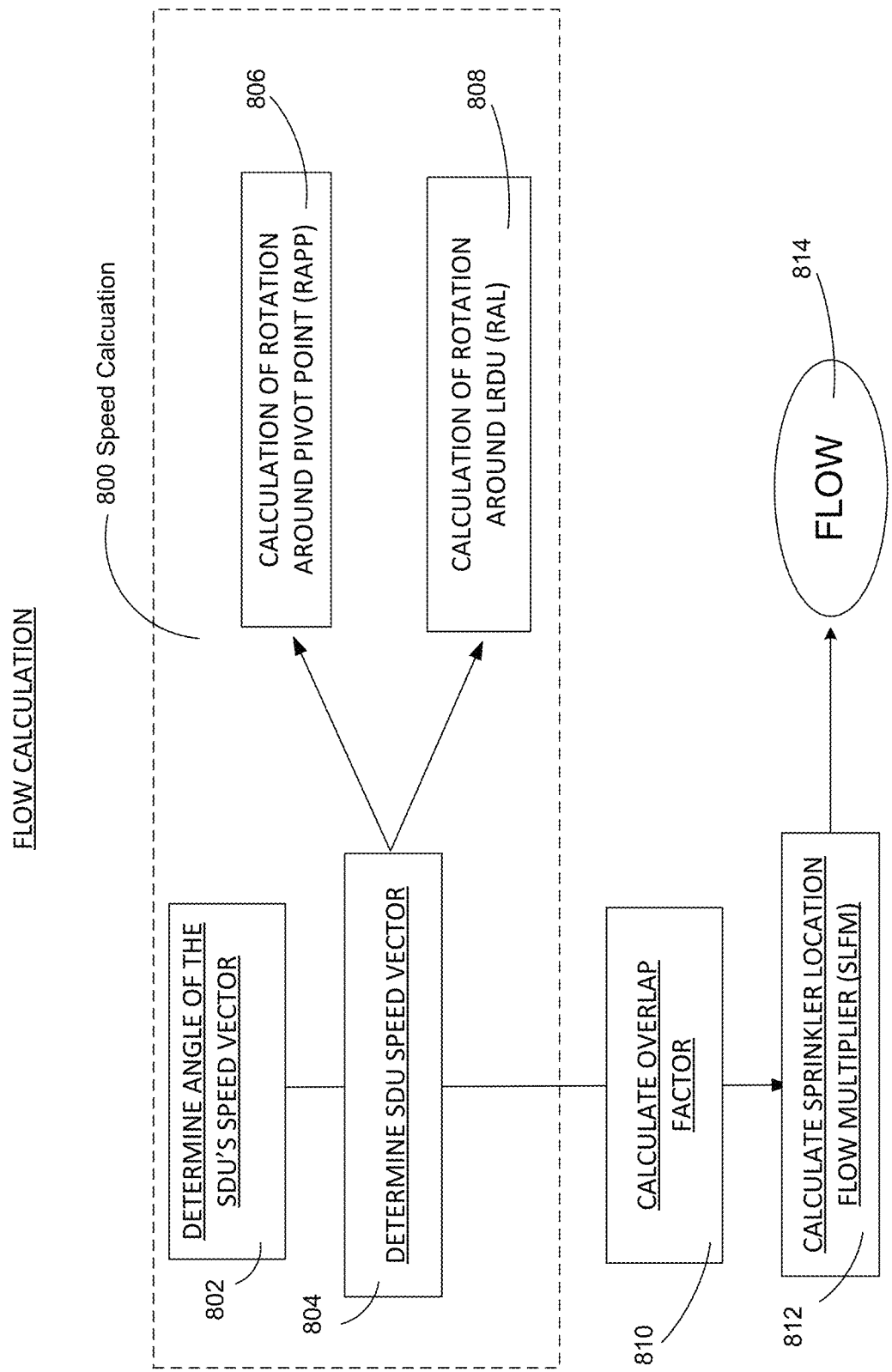
FIG. 8 is a block diagram illustrating exemplary steps of a method to calculate the water flow in corner arm sprinklers.

With reference now to FIG. 8, exemplary steps/sub-steps for calculating sprinkler flow rates (step 240 above) shall now be discussed. According to a preferred embodiment, Equation 1 below may preferably be used to calculate the sprinkler flow for each corner sprinkler.

Flow=Constant*Sprinkler Speed*Overlap Factor*SLFM         EQUATION 1

The Constant is preferably determined by the sprinkler type. The preferred steps for determining the sprinkler speed (step 800), the Overlap Factor (step 810) and the Sprinkler Location Flow Multiplier (SLFM) (step 812) are each separately discussed in detail below. Once calculated, the system preferably applies these values to EQUATION 1 to determine the sprinkler flow rates (step 814).

With reference again to FIG. 4, once all of the corner arm sprinkler flow rates are determined, in a next step 250, the sprinkler flows of each corner arm sprinkler are determined relative to the LDRU flow. The LRDU flow is preferably calculated based on the individual sprinkler rating/type (which is a constant) and the speed of the LRDU (i.e., Flow=Constant*Sprinkler Speed).

The water flow of each sprinkler must be proportional to its ground speed to achieve targeted discrete, controlled uniform and non-uniform water distribution rates. The faster a sprinkler is, the greater must be its water flow. All flows are computed relative to the LRDU flow that has a relative value of 1. For sprinklers between the pivot point and the LRDU, their flows must be proportional to their distance from the pivot point divided by the Pivot-Point-LRDU distance. For instance, a sprinkler that is halfway between the Pivot Point and the LRDU must have a relative flow of 0.5 to maintain constant angular movement, because its ground/linear speed is half the ground/linear speed of the LRDU.

A. Calculating Sprinkler Speed

Figure 9:
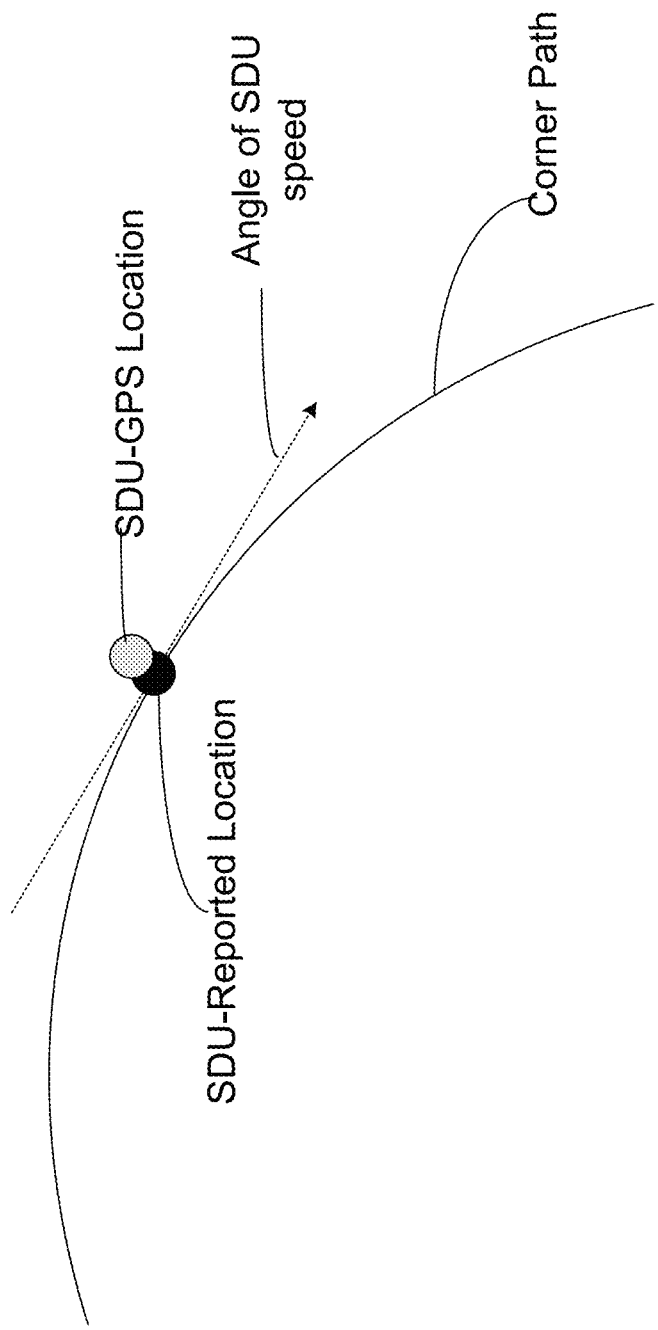
FIG. 9 is an illustration of the angle of the SDU speed vector.

With reference now to FIG. 8, exemplary steps for obtaining the sprinkler speed (step 800) are provided and discussed below. At step 802, the system preferably determines the angle of the SDU's speed vector. This angle may preferably be determined by the orientation of its wheels. Alternatively, the angle of the SDU speed vector may be calculated as the tangent to the corner path at the SDU reported location (as illustrated in FIG. 9).

At a next step 804, the SDU speed vector is calculated. According to a preferred embodiment, the movement of the SDU, as well as the movement of each sprinkler, is preferably split into two movements: a rotation around the pivot point (RAPP) (step 806) and a rotation around the LRDU (RAL) (step 808). As a result, the Sprinkler Speed Vector of the present invention is preferably calculated as the sum of two vectors: the Rotation Around the Pivot Point (RAPP) and the Rotation Around the LRDU (RAL). These vectors are illustrated in FIG. 10.

After the sprinkler speed calculations are made in steps 800-808, the remaining terms may be calculated including an Overlap Factor (step 810) and the Sprinkler Location Flow Multiplier (step 812) as explained further below.

1. Calculating Speed of Rotation Around Pivot Point (RAPP)—Step 806

Figure 10:
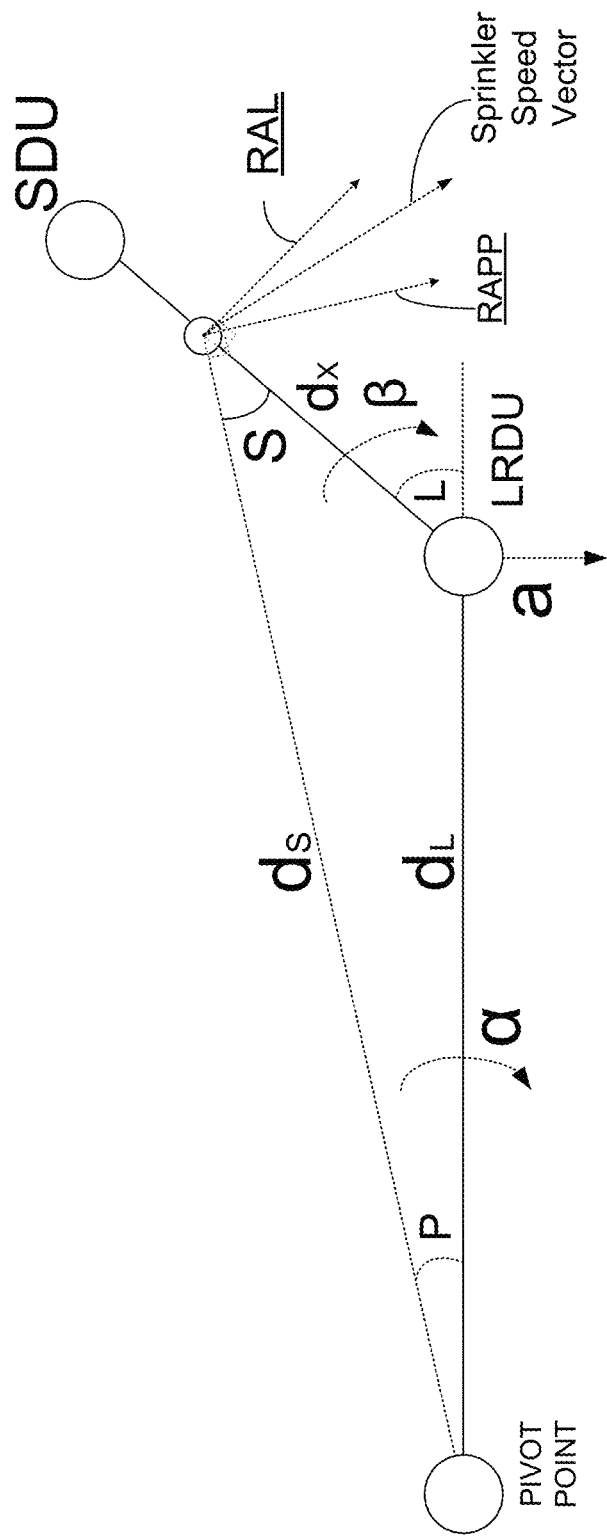
FIG. 10 is an explanatory diagram provided to explain exemplary steps shown in FIG. 8.

With reference to FIG. 10, the flow caused by the rotation around the pivot point may be computed using the ratio of the distance PP-Sprinkler ($d_s$) and the distance PP-LRDU ($d_L$). The amplitude and angle of the rotational speed around the Pivot Point (RAPP) are set values which cannot change. As a result, the angle of the RAPP is always perpendicular to the PP-Sprinkler axis (DS) and its amplitude is always determined by the amplitude of the LRDU Speed Vector. A preferred equation summarizing this relationship is provided in Equation 2 below.

$$|RAPP| = |LRDU \text{ Speed Vector}| * \frac{DS}{DL} \qquad \text{EQUATION 2}$$

Where:
DS is the distance between the PP and the sprinkler.
DL is the distance between the PP and the LRDU.

2. Calculating Speed of Rotation Around LRDU (RAL)—Step 808

The flow caused by the rotation around the LRDU may preferably be computed according to the ratio of the linear speed around the LRDU (angular speed around LRDU*sprinkler distance on corner) and the linear speed of the LRDU. Accordingly, when the pivot is extending, the flow caused by the rotation around the LRDU is positive. When the pivot is contracting (i.e., the SDU gets closer to the pivot point), it is negative.

Figure 24:
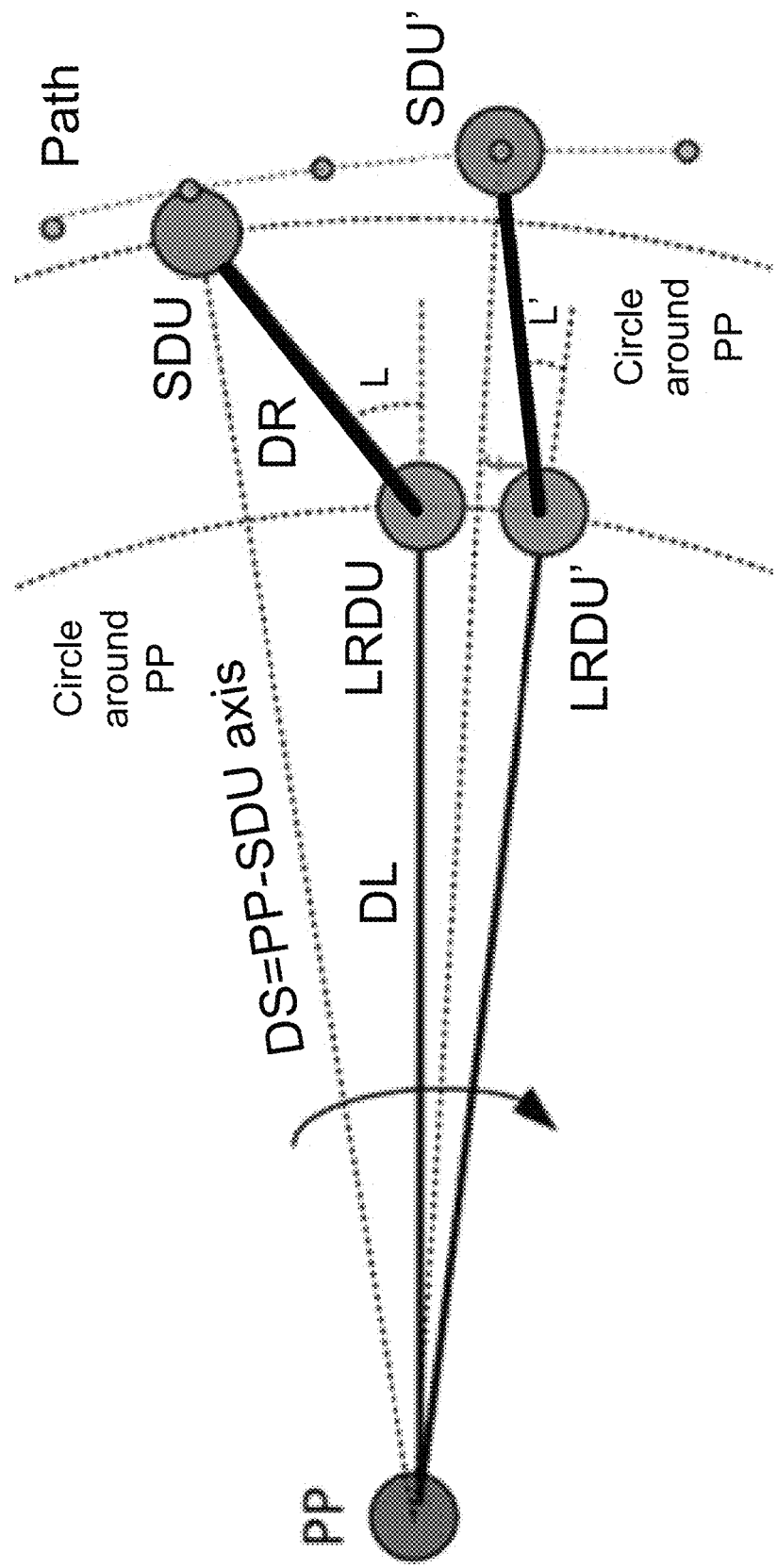
FIG. 24 is an explanatory diagram illustrating the movements of the LRDU and SDU over time.

The amplitude of the rotation around the LRDU is preferably determined according to the corner path. The SDU must follow a path in addition to turning with the LRDU around the pivot point. The path is used to determine the RAL vector of the SDU, and, as a side effect, the RAL vector of each sprinkler. According to a first exemplary embodiment, the amplitude of the RAL may be determined by first looking X meters ahead on the path to determine where the SDU will be (SDU'). An illustration of this movement is schematically shown in FIG. 24. The system may then calculate how much time is required to travel X meters (based on the LRDU speed and the distance (f)) and the degree of change in angle over the same period of time.

Figure 11:
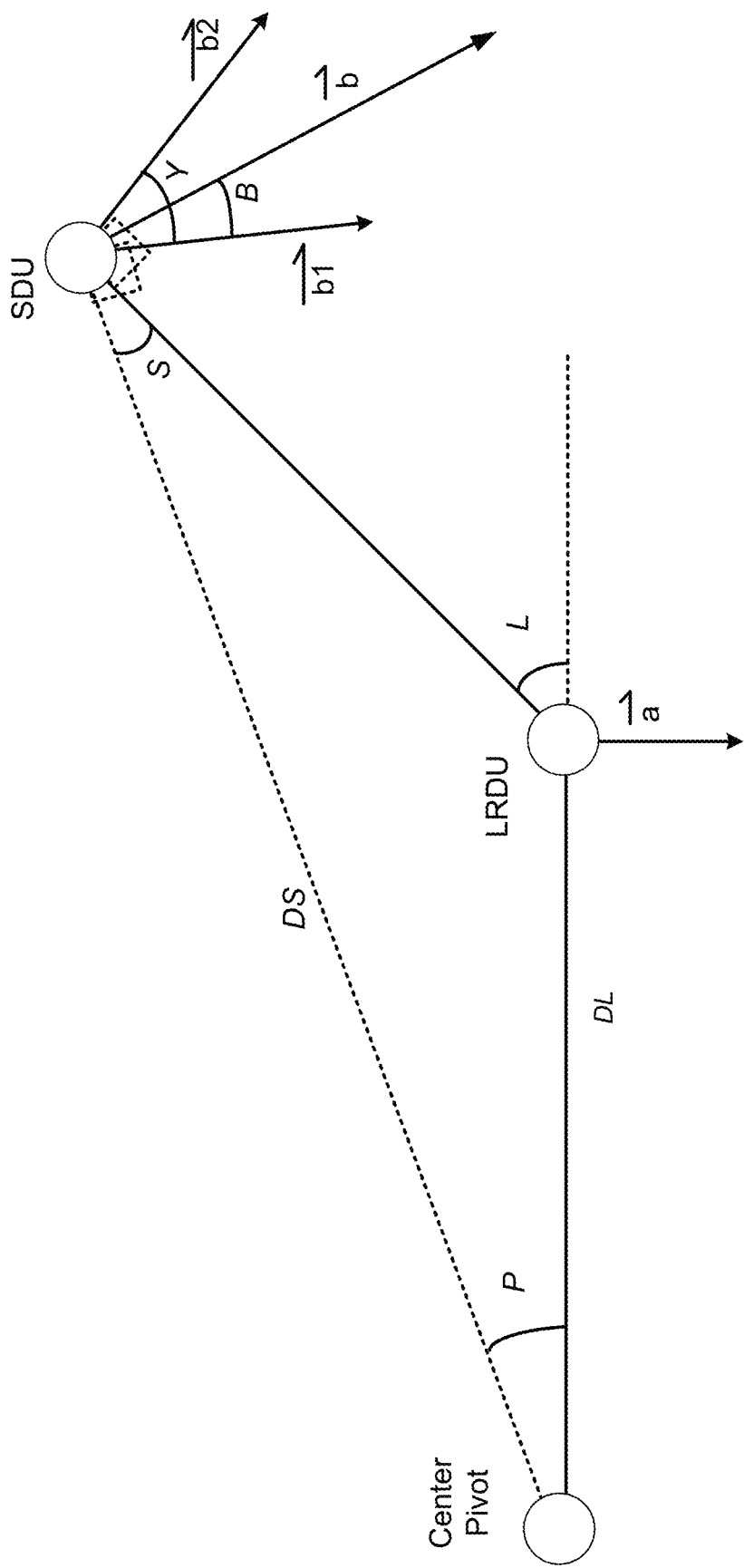
FIG. 11 is an explanatory diagram illustrating the exemplary variables used to calculate the norm of the SDU speed vector in accordance with the present invention.
Figure 12:
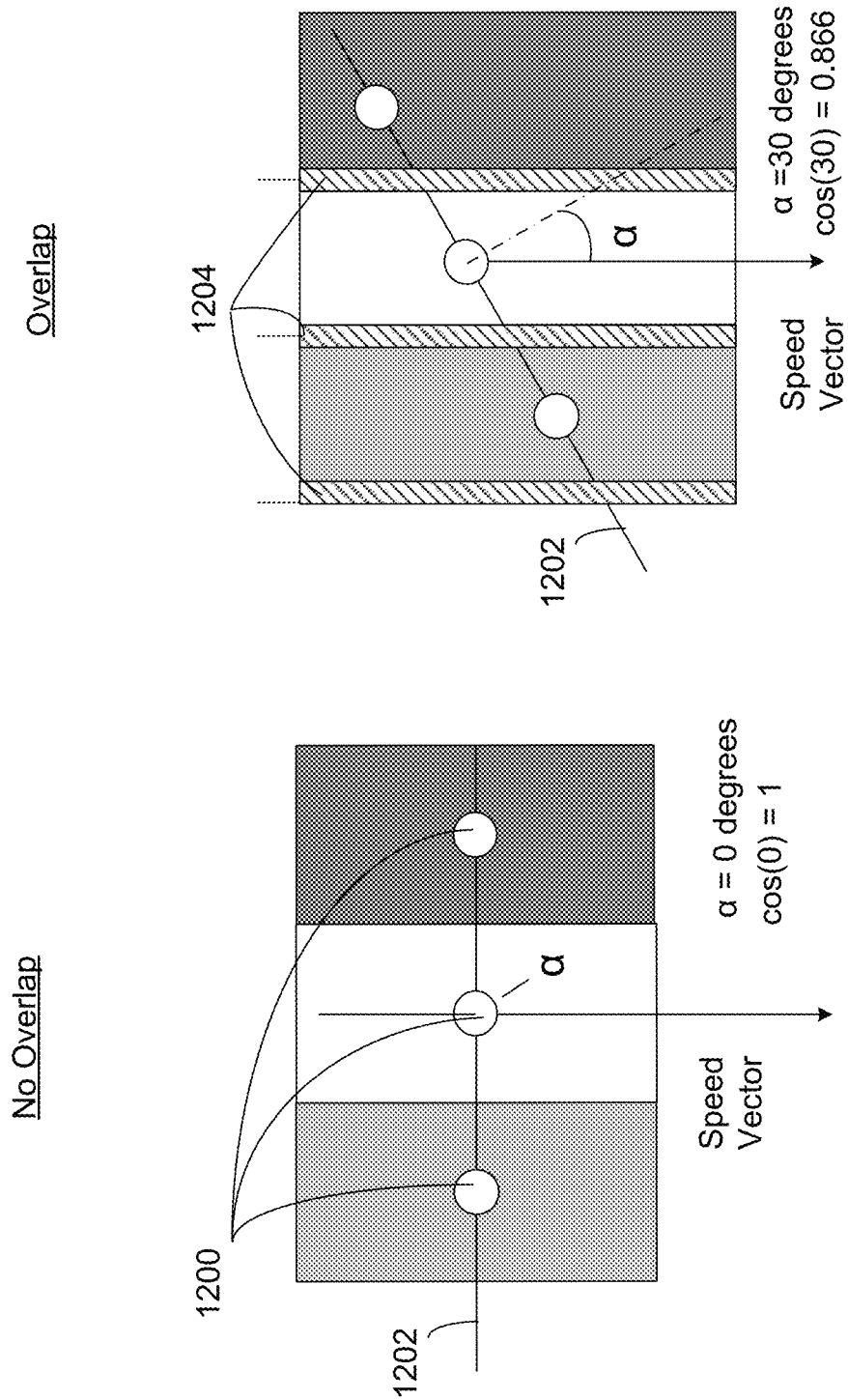
FIG. 12A is a diagram illustrating corner sprinklers run in parallel with no overlap between the watered sections.
FIG. 12B is a diagram illustrating corner sprinklers running at an angle with overlapping sections.

According to preferred embodiments, the amplitude/norm of the SDU speed vector (b=|b|) may be found by applying the following equation (Equation 3) to the variables listed below which are shown and explained in FIG. 11.

$$b = \frac{\sin((L-P))}{\sin((L-P)-B)} * \frac{D_s}{D_L} * |a|, \qquad \text{EQUATION 3}$$

Where:
DS is the distance between the Pivot Point (PP) and the SDU.
DL is the distance between the Pivot Point (PP) and the LRDU.
P, S, L and Y are various angles as shown in FIG. 10.
B is the angle of the speed vector.
$\vec{a}$ is the LRDU speed. This vector is perpendicular to DL to create a rotation.
$\vec{b}$ is the SDU speed: $\vec{b}=\vec{b_1}+\vec{b_2}$
$\vec{b_1}$ is the part of the SDU speed turning around the pivot point.
$\vec{b_2}$ is the part of the SDU speed turning around the LRDU.

B. Calculating the Overlap Factor

Figure 13:
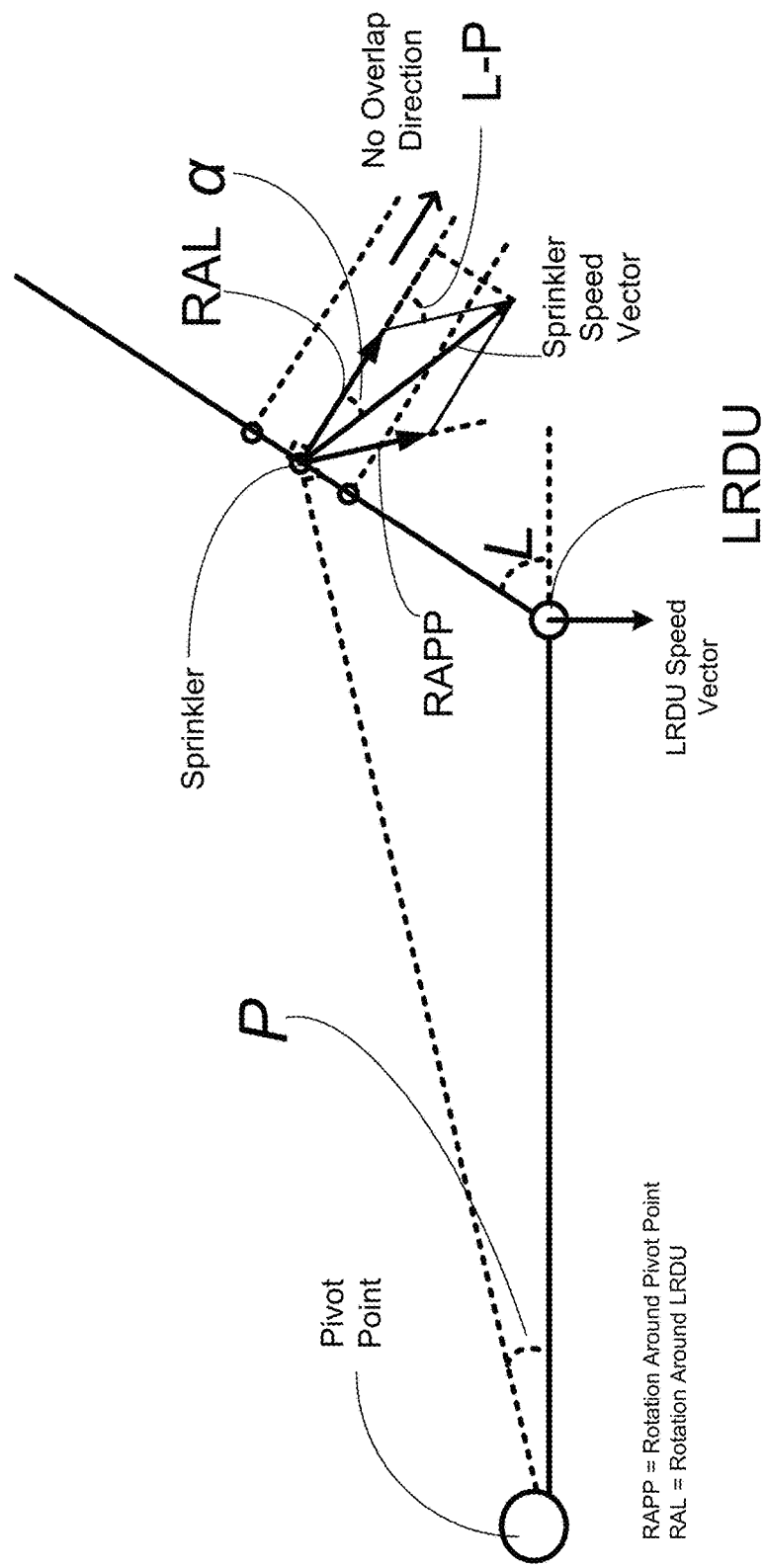
FIG. 13 is an explanatory diagram illustrating the exemplary variables used to calculate the Overlap Factor in accordance with the present invention.

With reference now to FIGS. 12A, 12B and 13, an exemplary method for calculating the Overlap Factors between corner sprinklers shall now be discussed. FIG. 12A provides a first illustration of a set of sprinklers 1200 on a corner arm 1202 moving in a direction perpendicular to the main axis of the corner arm 1202. Travelling in this direction, the overlap between sprinklers due to the motion of the corner arm 1202 is effectively zero. FIG. 12B provides an illustration of the creation of overlap bands 1204 which occurs when the corner sprinklers do not move perpendicular to the corner arm. In order to create targeted discrete, controlled uniform and non-uniform water distribution rates, these overlapping bands 1204 must be calculated and taken into account as detailed below.

Referring now to FIG. 13, according to a preferred embodiment, the amount of overlap is preferably calculated as an Overlap Factor which is dependent on the angle between the Pivot Point and the Corner Arm (labeled L), and the angle between the Pivot Point and the individual sprinkler of interest (labeled P). With these factors known, the Overlap Factor is preferably calculated for each sprinkler of interest according to the equation below:

$$\text{Overlap Factor} = \cos(L-P) \quad \text{EQUATION 4}$$

Where:
- L is the angle between the Pivot Point and the Corner Arm, and
- P is the angle between the Pivot Point and the individual sprinkler of interest.

The Overlap Factor affects the Rotation Around the Pivot Point (RAPP) only. Further, the RAL vector as shown is always parallel to the No Overlap Direction. According to further preferred embodiments, the first and last sprinklers on the Corner Arm overlap with a lesser number of sprinklers and require a further adjusted computation to provide correct Overlap Factors for each.

Figure 14:
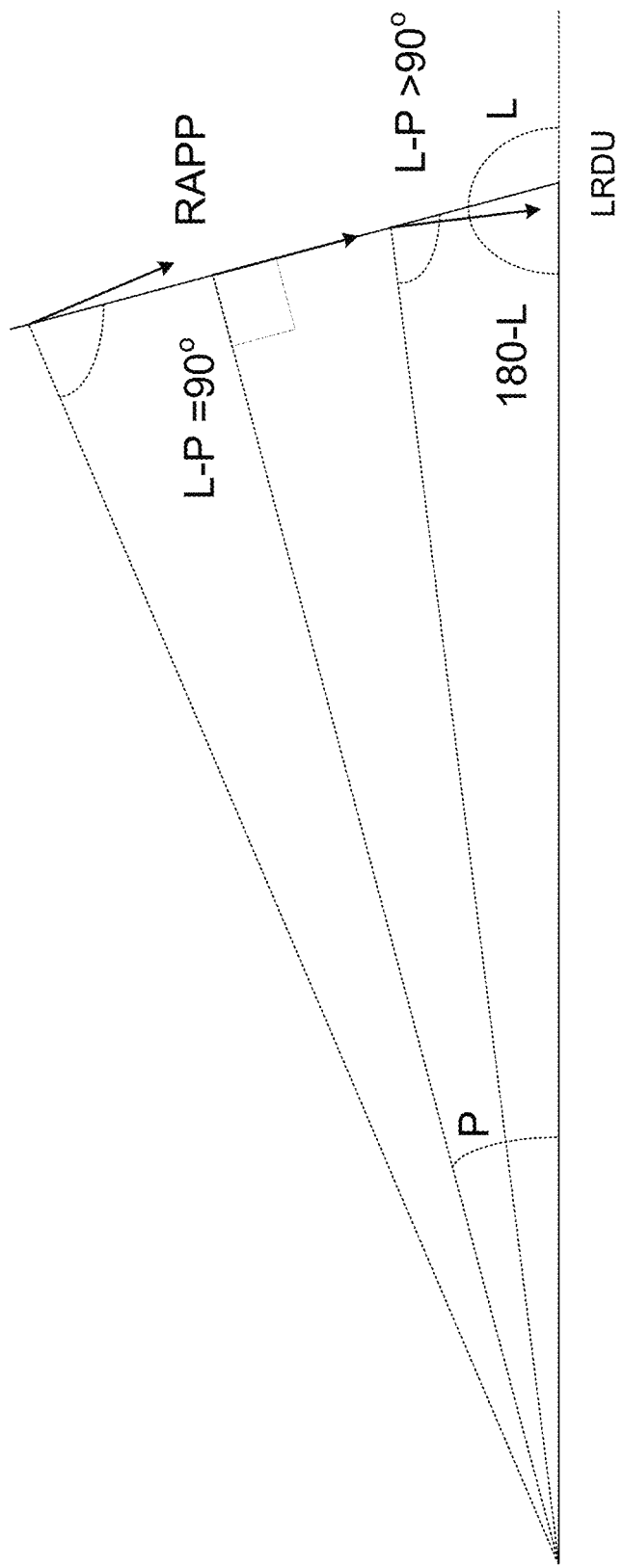
FIG. 14 is an explanatory diagram illustrating aspects of calculating the Overlap Factor in accordance with the present invention.

With reference to FIG. 14, when the angle L-P is 90 degrees or more, the cos(L-P) becomes 0 or negative indicating when a corner sprinkler totally overlaps with other inner corner sprinklers. In such cases, the Overlap Factor is preferably set to 0. Further, it is important to note that the P angle change from corner sprinkler to corner sprinkler is smaller for the first sprinkler of the corner and larger for the last sprinkler on the overhang. As a result, the maximum overlap angle should preferably be evaluated for each sprinkler.

With regards to the first corner sprinkler (closest to the LRDU) and the last corner sprinkler, the Overlap Factors of the present invention may alternatively be calculated by using the equations below.

$$\text{Overlap Factor 1st Corner Sprinkler} = 1 * \frac{d1}{d1+d2} + \cos(L-P) * \frac{d2}{d1+d2} \quad \text{EQUATION 5}$$

$$\text{Overlap Factor Last Sprinkler} = (1-x) + \cos(L-P) * x \quad \text{EQUATION 6}$$

C. Sprinkler Location Flow Multiplier (SLFM).

Figure 15:
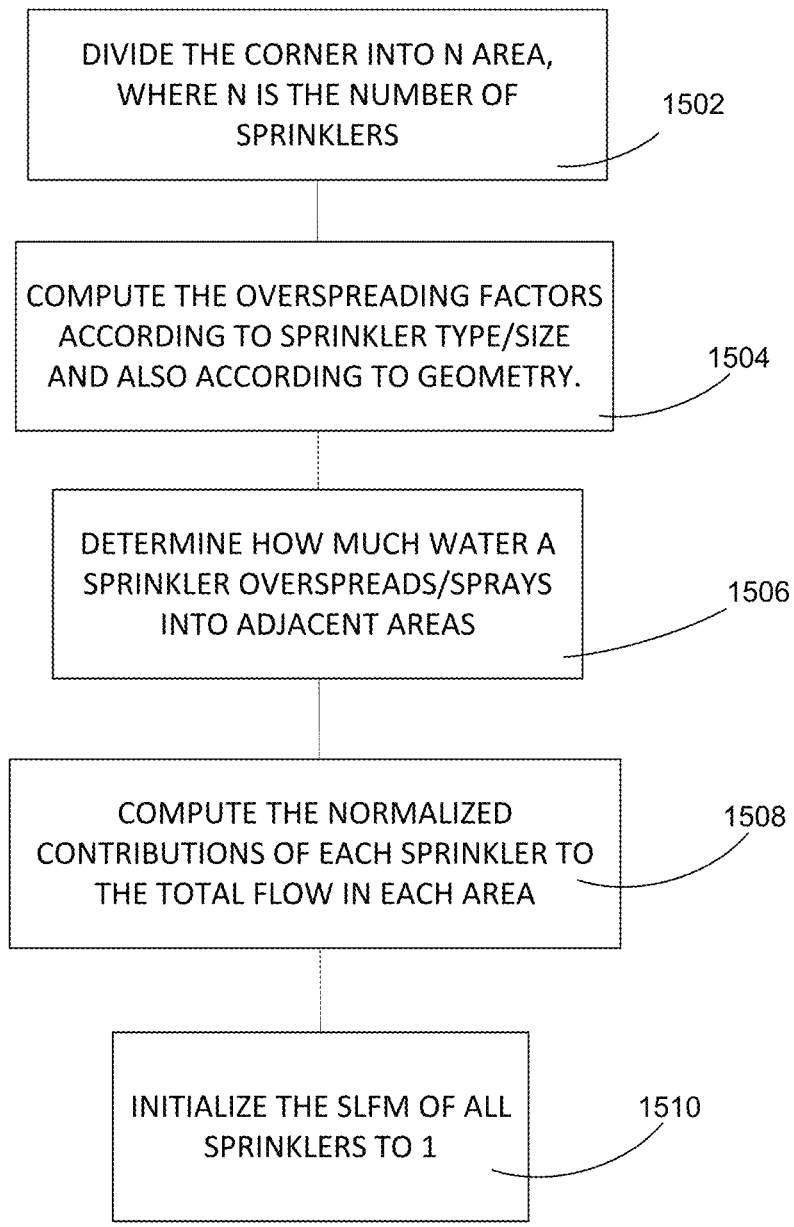
FIG. 15 is a block diagram illustrating exemplary method steps for calculating the SLFM of the present invention.

With reference now to FIG. 15, an exemplary method for calculating the SLFM according to the present invention shall now be discussed. At a first step 1502, the corner arm is first divided into N areas (i.e., one area under each sprinkler, where N is the number of sprinklers). Accordingly, there is one area under each sprinkler with boundaries in the middle of the distances between sprinklers.

At a next step 1504, overspreading factors are then calculated according to sprinkler type/size and also according to geometry. At a next step 1506, the system determines the contribution of each sprinkler to the total water flow in each area. At a next step 1508, the system calculates the normalized contributions of each sprinkler to the total flow in each area (with the total being 100%). The normalized contribution is a measure of the relative importance of each area for a sprinkler. At a next step 1510, the system preferably initializes the SLFM of all sprinklers to 1.

Figure 16:
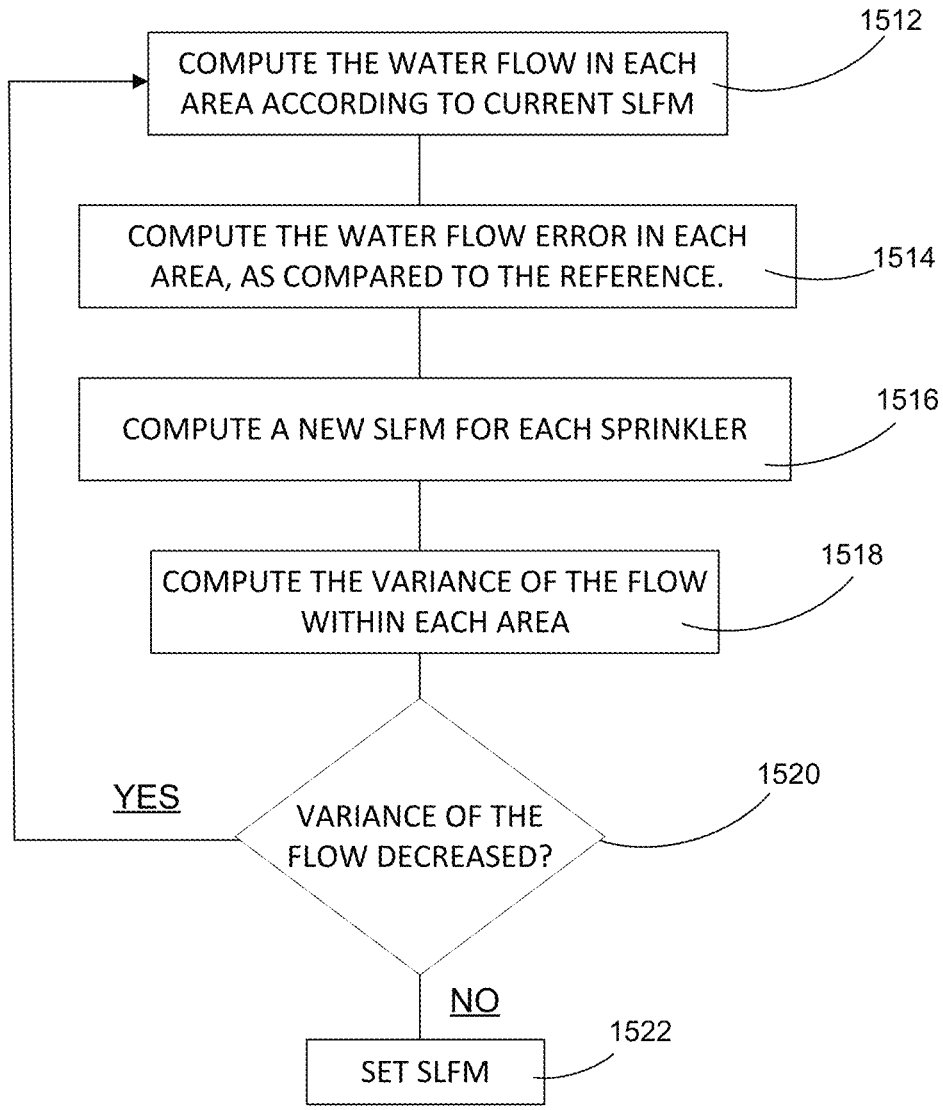
FIG. 16 is a block diagram illustrating additional method steps for the method shown in FIG. 15.

With reference now to FIG. 16, at a next step 1512, the system then computers the water flow in each area according to the current SLFM (assuming that all sprinklers have the same flow rate). At a next step 1514, the system computes the water flow error in each area, as compared to the reference. This is the ratio "[Water Flow In Area]/[Reference Water Flow]" for each area. At a next step 1516, a new SLFM for each sprinkler "i" is preferably calculated according to: the Water Flow Error, the Normalized Contributions and the previous SLFM as shown in Equation 7 below:

$$\text{New } SLFM_i = \left[ \sum_{Area=1}^{Area=N} \left( \frac{\text{Reference}}{\text{Water } Flow_{Area}} \right) * NormContribution[i][Area] \right] * \text{Previous } SLFM_i \quad \text{EQUATION 7}$$

At a next step 1518, the system preferably computes the variance of the flow within each area. At step 1520, if the variance of the flow within each area has decreased, the system proceeds to iterate the SLFM computation by returning to step 1512 with the new SLFM. At step 1522, if the variance has not decreased, the SLFM is set.

With reference now to FIGS. 17 and 18, an example SLFM calculation is provided below. This example is provided for explanatory purposes only.

EXAMPLE

Assuming a system with 103 sprinklers (with the sprinkler 103 being the last sprinkler on the overhang) and that all sprinklers have a flow of 100 GPM*SLFM. Further assume that the system must provide 120 GPM per area. The SLFM will be computed as follows:

1—Create 103 areas, one area under each sprinkler.
2—Determine how much water a sprinkler overspread in other area according to its spray radius and flow profile. For the purpose of this example, if the sprinkler provides 100 GPM, we assume that 20 GPM is overspread into each adjacent area and 60 GPM is spread in the area under the sprinkler as shown in FIG. 17.
3—The contributions of sprinkler 102 to total water flow in each area is:
  a. 20% in Area 101
  b. 60% in Area 102
  c. 25% in Area 103
4—The normalized contributions of sprinkler 102 to total water flow in each area is:
  a. 20%/105% in Area 101
  b. 60%/105% in Area 102
  c. 25%/105% in Area 103
5—Initialize the SLFM of all sprinklers to 1. We will assume that SLFM 1 means 100 GPM per sprinkler for the purpose of the example.
6—Compute the water flow in each area:
  a. Water flow in Area 101=20*1+60*1+20*1 GPM
  b. Water flow in Area 102=20*1+60*1+20*1 GPM
  c. Water flow in Area 103=20*1+60*1 GPM 7—Compute the water flow error in each area. For purpose of the example, we will assume that the goal/target is 120 GPM per area for the purpose of the example. The "120-GPM" reference may preferably be computed according to a reference section of the pivot.
   a. Error in Area 101 is 100/120.
   b. Error in Area 102 is 100/120.
   c. Error in Area 103 is 80/120.
8—The new SLFM for sprinkler 102 will be:
   a. SLFM change due to area 101+change due to area 102+change due to area 103.
   b. (120/100*20%/105%+120/100*60%/105%+120/80*25%/105%)*Previous SLFM
9—Iterate SLFM computation. This gives table shown in FIG. 16 (SLFM*100 GPM is the sprinkler flow).

From the result table shown in FIG. 18, it is shown that the Water Flow in the Area progressively converges towards the reference and that the standard variation of the Water Flow decreases: the water flow is more uniform. However, the standard deviation of the SLFM increases: the last sprinkler of the corner becomes much bigger than the other sprinklers as the number of iterations increases. This causes larger variations of the flow within area 102 and the variance of the flow within this area increases.

II. Calculating Sprinkler Flow

As detailed above, the flow rate for each of the corner sprinklers (i.e., sprinklers between the LRDU and the SDU) may preferably be calculated using Equation 1 below.

Flow=Constant*Sprinkler Speed*Overlap Factor*SLFM    EQUATION 1

Inserting each of the equations 2-4 above, the sprinkler flow calculation may preferably be determined using Equation 8 below:

$$\frac{F_i}{F_L} = \left[\frac{d_s}{d_L}\cos(L-P) + \frac{\beta \cdot d_X}{a}\right] * SLFM[i] \quad \text{EQUATION 8}$$

Where, as shown on FIG. 10:
L, S and P are angles at LRDU, SDU and Pivot Point.
ds is the distance between the sprinkler and the pivot point.
dx is the distance between the sprinkler and the LDRU.
dL is the distance between the LRDU and the pivot point.
a is the linear speed of the LRDU, a=α*dL.
α is the angular speed of the pivot, β is the angular speed of the SDU around LRDU.
SLFM[i] is a constant for each sprinkler taking into account distances between sprinklers.

In executing Equation 8 above, it is important to note that the term $$\frac{\beta \cdot a_X}{a}$$

is the flow caused by the rotation of the sprinkler around the LRDU only, with β*dx being the linear speed of the sprinkler turning around the LRDU. Accordingly, when the corner pivot is extending, this component of the flow is positive. However, when the corner pivot is contracting, this component is negative. As a result, the overall flow could be null or even negative which may result in a small flow error. According to a preferred embodiment, the system may in these circumstances set the flow to 0.

III. Desired Duty Cycle Adjustments

Referring again to FIG. 4, at a final step 252, the flow rates of the individual sprinklers are preferably adjusted by adjusting the duty cycle of each sprinkler to create discrete application rates (e.g., uniform and/or non-uniform rates) for different areas within a given total area to be irrigated. For example, for a sprinkler that has an aperture that is twice the aperture of the reference sprinkler at LRDU (i.e., the Flow Coefficient of the sprinkler is 2) and the target is to achieve a relative flow of 1.2, then the system will adjust the duty cycle to be 1.2/2 or 60%. Preferably, the system also takes into account the sprinkler density that is computed according to a reference distance between sprinklers. Accordingly, if two identical sprinklers are at the same location, their relative flow must be halved. Additionally, the system preferably considers the prescriptions for each sprinkler and applies the duty cycle adjustments to each desired flow by a fraction between 0 and 4.

According to a further preferred embodiment, the duty cycle may be computed as follows:

$$DC_i = \frac{\text{Desired Relative } Flow_i}{\text{Flow } Coefficient_i} \quad \text{EQUATION 9}$$

Where:
The Desired Relative Flow is the desired flow of the sprinkler divided by the flow at LRDU.
The Flow Coefficient is the ratio of the sprinkler size of the sprinkler size at LRDU.
Alternatively, the [Desired Relative Flow] may also be calculated as follows:

$$\text{Desired Relative } Flow_i = \frac{\text{Sprinkler } Speed_i}{LRDU \text{ Speed}} * \quad \text{EQUATION 10}$$

$$\text{Overlap } Factor_i * SLFM_i * Prescription_{ij}$$

Where:
Sprinkler Speed is the sum of the speed vector for rotation around the pivot and the speed vector for rotation around the LRDU.
LRDU Speed is the speed of the motor at LRDU.
Overlap Factor is the reduction of the sprinkler flow because the sprinkler overlaps with other sprinklers of the corner arm. This value is between 0 (full overlap, pivot retracted) and 1 (pivot fully extended).
[SLFM] is a sprinkler location flow multiplier as discussed further herein.
[Prescription] is a user input to reduce/increase the water rate in specific location of the field.

According to a further alternative preferred embodiment, the system may use the Desired Relative Flow equation below.

$$D.R. \ Flow_i = \quad \text{EQUATION 11}$$

$$\frac{\text{Rotation Around } PP_i + \text{Rotation Around } LRDU_i}{LRDU \text{ Speed}} *$$

$$\cos(\alpha)_i * SLFM_i$$

Where:
[Rotation Around PP] is a speed vector for the rotation around the pivot point.

[Rotation Around LRDU] is a speed vector for rotation around the LRDU.

Figure 23:
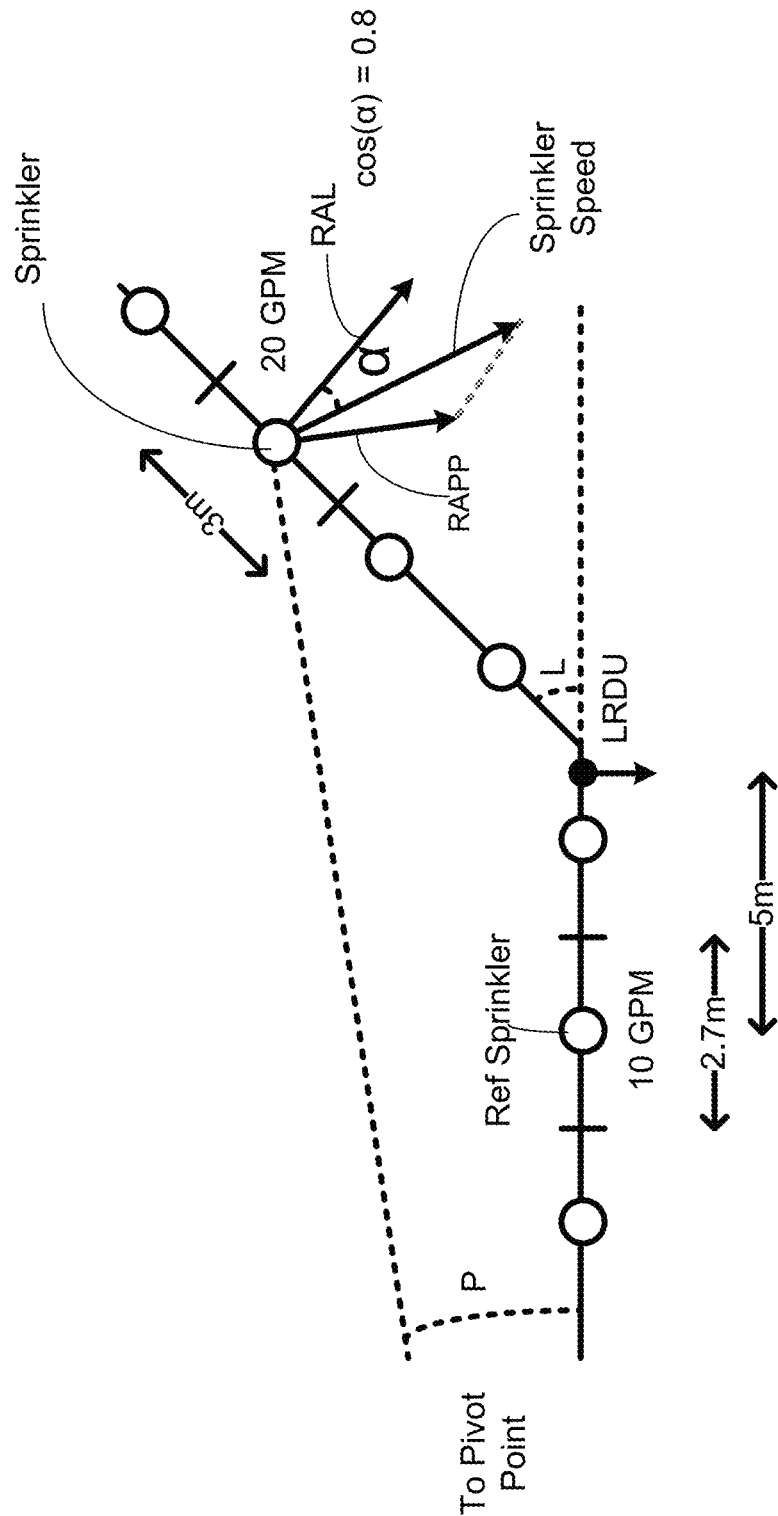
FIG. 23 is an explanatory diagram illustrating the calculation of duty cycle adjustments.

With reference now to FIG. 23, an example Duty Cycle Computation is provided below. This example is provided for explanatory purposes only.

EXAMPLE

For this example, a system is illustrated where a sprinkler on the corner is sized to output 20 GPM of water. In this system, the sprinkler speed required to follow the corner path, while turning around the LRDU is 1.2 times the speed of the LRDU. The Pivot Point is 300 m on the left of FIG. 23. With these system parameters, the duty cycle of a 20 GPM sprinkler is calculated as below.

The speed of the reference sprinkler is the LRDU speed* (300 m−5 m)/300 m. As a result, the Sprinkler Speed is 1.2*300/(300−5) times the speed of the reference sprinkler. This is covered by the flow coefficient.

The corner sprinkler must cover a segment of 3 m while the reference sprinkler must cover a segment of 2.7 m only. The flow of the corner sprinkler should be 3 m/2.7 m times the water flow of the reference sprinkler. This is the Sprinkler Location Flow Multiplier.

Putting these elements into the equations above, the duty cycle according to the present invention is calculated as follows:

$$\text{Duty Cycle} = 1.2 * \frac{10 GPM * (300 \text{ m}/295 \text{ m})}{20 GPM} * 0.8 * \frac{3 \text{ m}}{2.7 \text{ m}} = 0.542373$$

IV. Exemplary Methods for Steps 218-222 of the Present Invention

Further explanations of steps 218-222 (shown in FIG. 3 above) shall now be discussed.

1. Conversion of SDU GPS Signal to X-Y Distance from Pivot Point—Step 218

Figure 5:
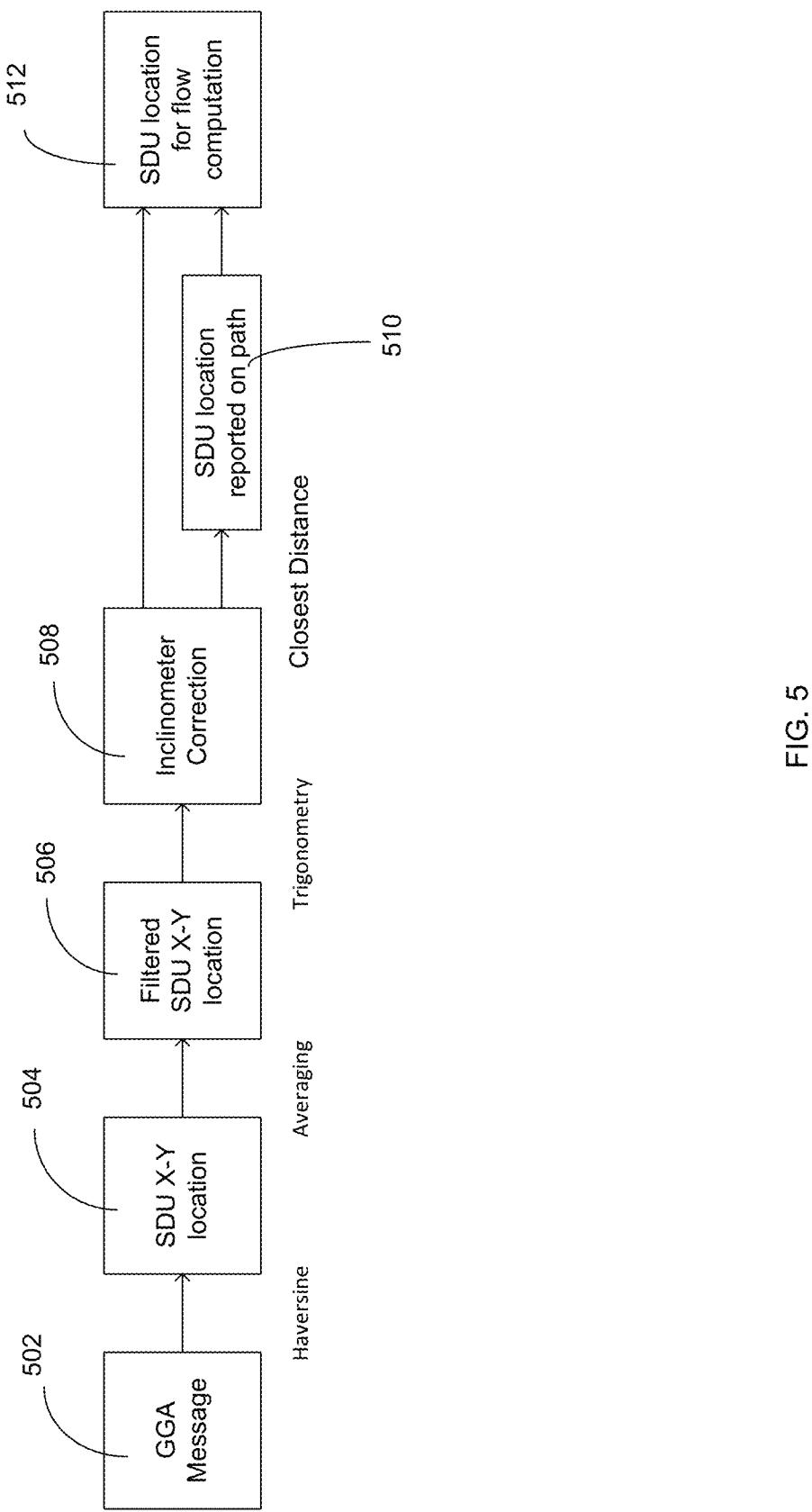
FIG. 5 is a block diagram illustrating an exemplary method for executing step 218 of the first exemplary method.

With reference now to FIG. 5, an exemplary method for executing step 218 shall now be discussed. As shown in FIG. 5, steps/sub-steps 502-512 may be used to convert a received GPS signal (GGA messages) for the SDU into an (X, Y) location indicating distance to from the pivot point (understood to be at an origin point (0, 0).

As shown in FIG. 5, according to a first exemplary step 502, the system may receive GPS data which may be received as a GGA message field from a GPS device. At a next step 504, the system may apply the Haversine formula to first compute the Y distance first ([PP Latitude, PP Longitude], [SDU Latitude, PP Longitude]). Thereafter, the Haversine formula may be again used to compute the X distance ([PP Latitude, PP Longitude], [PP Latitude, SDU Longitude]) of the SDU location. At a next step 506, the determined (X,Y) position of the SDU may be further filtered to adjust for the different messaging rates between irrigation components and GPS signals. At a next step 508, the SDU position might be further corrected to determine the position of the SDU-wheels using an inclinometer. At a next step 510, the determined SDU location may be reported on an assigned path. Finally, at a next step 512, the SDU location may preferably be finalized and provided to the flow rate module 150 for further processing.

Calculating the Corner Path—Step 220

Figure 19:
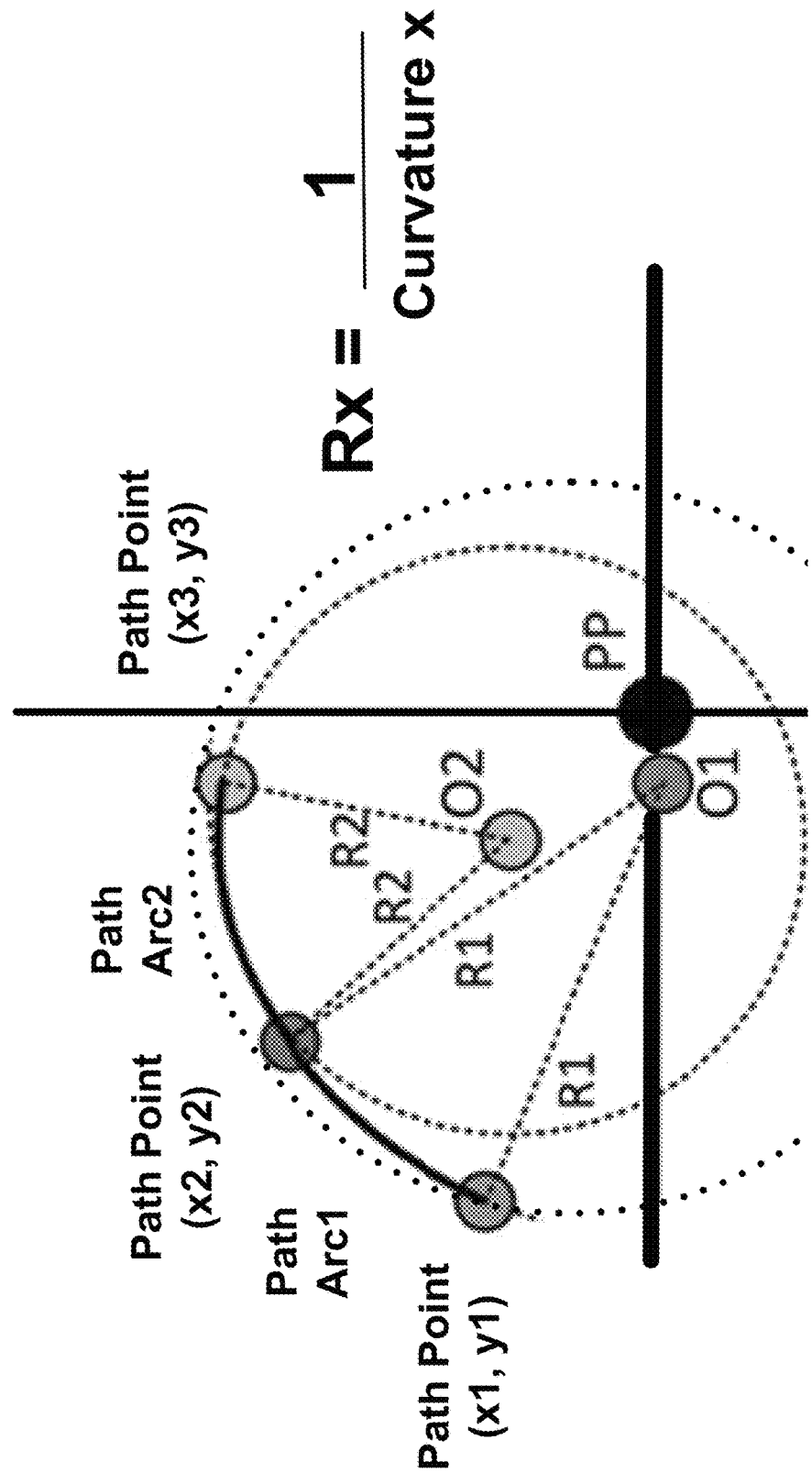
FIG. 19 is an explanatory diagram illustrating an exemplary corner path.

With reference now to FIG. 19, an exemplary method for executing step 220 (shown in FIG. 3) shall now be discussed. For sprinklers on the corner arm (e.g., between the LRDU and SDU), the path of the SDU (also referred to as the "Corner Path" or "Corner") must first be determined in order to calculate linear speeds and flow rates. As illustrated in FIG. 19, the SDU path is preferably calculated by the system as a sequence of points linked together with arcs of circles with each arc defined with two points and a curvature. Within the algorithms of the present invention, the SDU position is assumed to be known based on GPS and may be calculated as the X, Y position of the SDU wheels relative to the Pivot Point (which is assumed to be at coordinates 0,0) within a given time window.

LRDU Position Computation from SDU Position—Step 222

Figure 6:
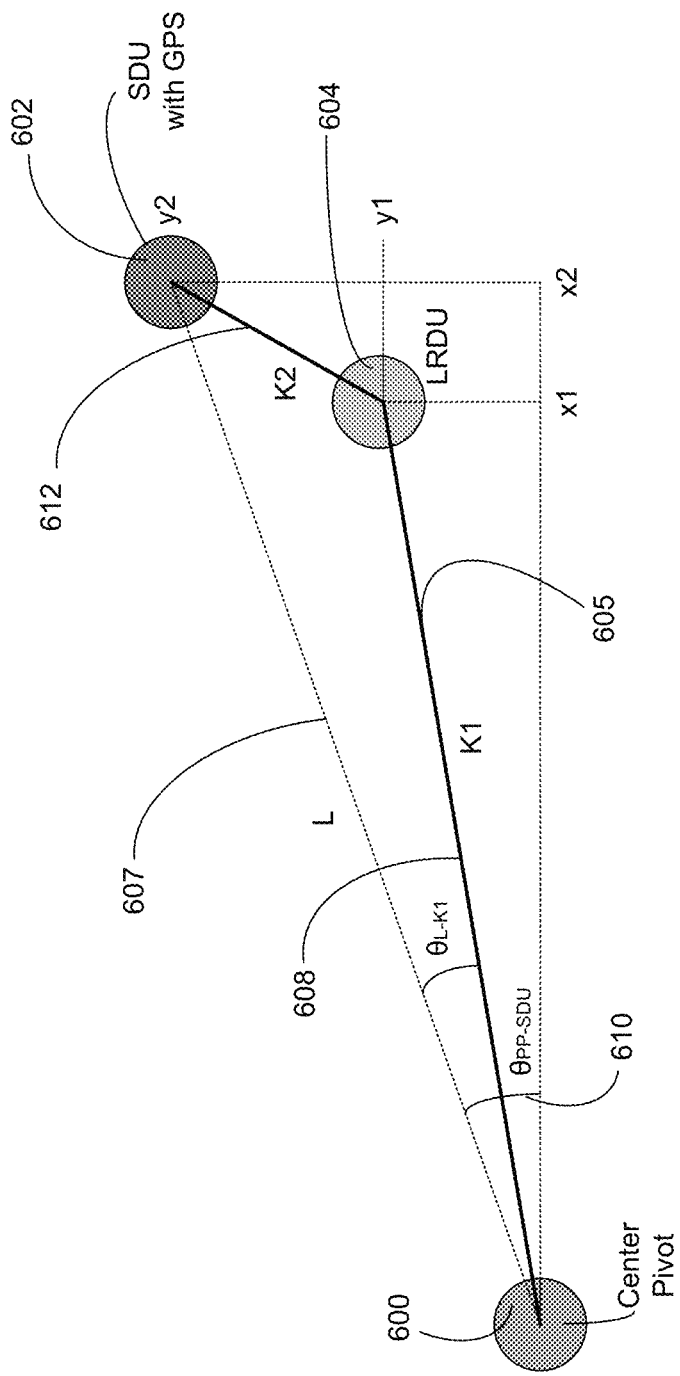
FIG. 6 is an explanatory block diagram provided to explain exemplary steps 702-708 shown in FIG. 7.
Figure 7:
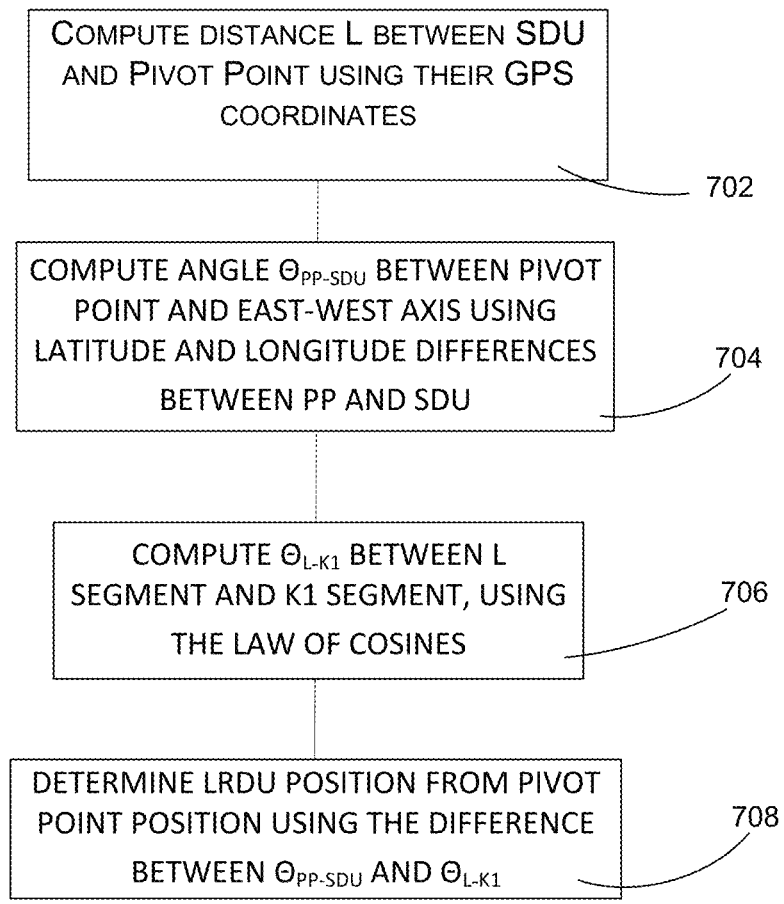
FIG. 7 is a block diagram illustrating an exemplary method for executing step 222 of the first exemplary method.

With reference now to FIGS. 6 and 7, an exemplary method for executing step 222 (shown in FIG. 3) shall now be discussed. FIG. 6 is provided for explanatory purposes to discuss the exemplary steps 702-708 (shown in FIG. 7) for calculating an LRDU position (X, Y) from the determined SDU (X, Y) position. Referring now to FIG. 7, the LRDU location (X, Y) position may be calculated from a first set of data including:

the known GPS coordinates of the SDU 602;
the known GPS coordinates for the LRDU 604;
the distance between the LRDU 604 and the Pivot Point 600 (labelled as K1 605), which is known and always constant;
the distance between LRDU 604 and SDU 602 (labelled as K2 612) which is known and always constant; and
the relative positions of the LRDU 604 and the SDU 602 (i.e., leading or trailing).

With this first set of known data, the system of the present invention may perform an LRDU 604 position computation (step 220) using steps 702-708 as shown in FIG. 7. At a first step 702, the system may compute the distance L between the SDU 602 and the Pivot Point 600 using their GPS coordinates. At a next step 704, the system may compute the angle (i.e., LO PP-SDU) between the Pivot Point 600 and the East-West Axis of the system using the latitude and longitude differences between Pivot Point 600 and the SDU 602. At a next step 706, the system may compute the angel (i.e., $\angle \theta L-K1$) between the L segment (607) and the K1 segment (605), using the Law of Cosines. At a next step 708, the system may determine the LRDU 604 position from Pivot Point 600 position using the difference between angles $\angle \theta$ PP-SDU and $\angle \theta$ L-K1.

Exemplary Method for Calculating Flow of Sprinkler Between Pivot Point and LRDU

Figure 20:
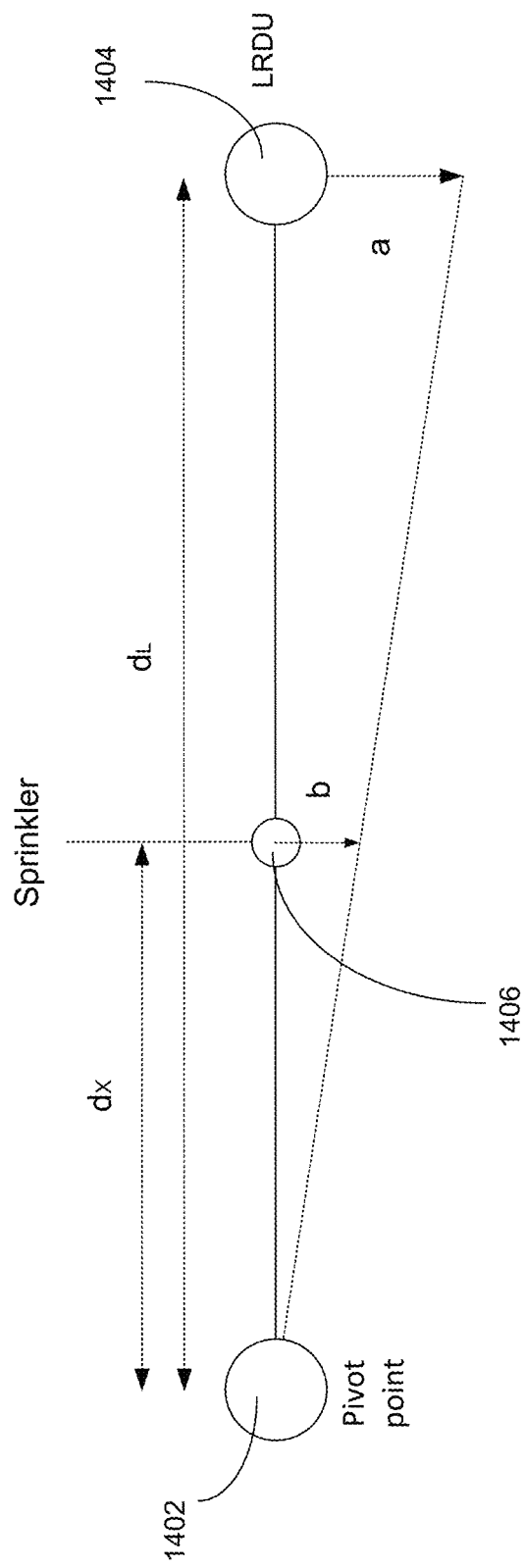
FIG. 20 is an explanatory diagram illustrating the calculation of sprinkler flow between the Pivot Point and the LRDU.
Figure 21:
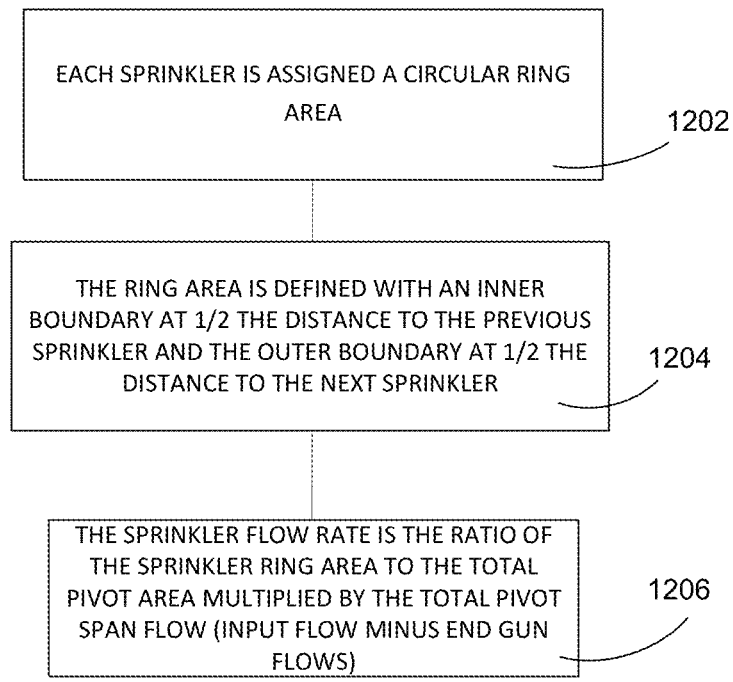
FIG. 21 is block diagram illustrating an exemplary method for calculating sprinkler spray area width.
Figure 22:
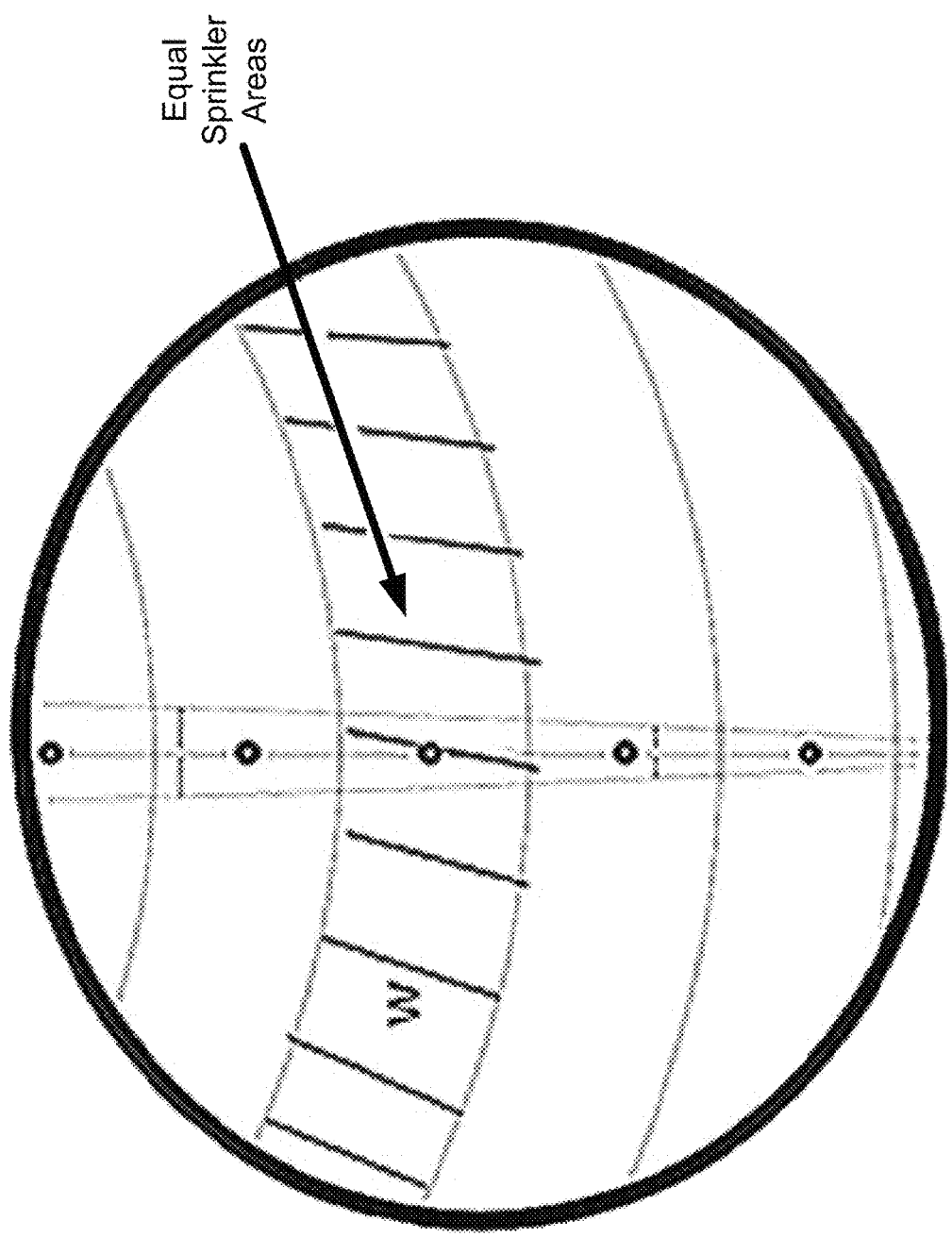
FIG. 22 is an illustration showing defined sprinkler irrigation areas.

With reference now to FIGS. 20 and 21, an exemplary method for calculating the flow of sprinklers between the Pivot Point and the LRDU shall now be discussed (i.e., LRDU sprinklers). With reference to FIG. 20, the relationship between the speed is the same as the relationship between the distances from the Pivot:

$$\frac{b}{a} = \frac{d_X}{d_L}$$

Where:
b is Sprinkler speed (linear speed)
a is LRDU speed (linear speed)
$d_X$ is distance between Pivot Point and sprinkler
$d_L$ is distance between Pivot Point and sprinkler at LRDU.

Accordingly, the relationship between the flows of the LRDU ($F_L$) and the flow of a given LRDU sprinkler ($F_x$) to achieve water distribution uniformity is:

$$\frac{F_X}{a} = \text{Constant} = \frac{F_L}{b}$$

Further, the water flow of a sprinkler at distance $d_X$ from the pivot point must be a fraction of the LRDU flow:

$$F_X = \frac{b}{a} * F_L = \frac{d_X}{d_L} * F_L \gg Z ==> \frac{F_X}{F_L} = \frac{d_X}{d_L} \quad \text{Equation 12}$$

In addition to calculating sprinkler flows as per Equation 12, it is also necessary to take into account the width of the covered area for each sprinkler. Referring now to FIG. 21, the width of a covered area may be calculated using the following exemplary steps. At a first step 1202, each sprinkler is assigned a circular ring area. At a next step 1204, the ring area is defined (see FIG. 22) with an inner boundary at ½ the distance to the previous sprinkler and the outer boundary at ½ the distance to the next sprinkler. At a next step 1206, the sprinkler flow rate is calculated as the ratio of the sprinkler ring area divided by the total pivot area multiplied by the total pivot span flow (Input flow minus end gun flows).

According to an alternative embodiment, if all sprinklers have the same distances between each other, using a ring area to compute the flow of a sprinkler is equivalent to using its speed: the flow at LRDU is $2\pi * dL * w$, where w is the distance of a sprinkler from its neighbors or the width of sprinkler-covered area. From this equation, it is determined that the ratio of the speeds is the same as the ratio of the ring areas:

$$\frac{F_X}{F_L} = \frac{2\pi d_X * w_x}{2\pi d_L * w_L} ==> \frac{d_X}{d_L} \text{(equidistant)} \quad \text{EQUATION 13}$$

While the above descriptions regarding the present invention contain much specificity, these should not be construed as limitations on the scope, but rather as examples. Many other variations are possible. For example, although the present system is discussed with regards to a self-propelled irrigation system, other irrigation systems may also incorporate the present invention without limitation. Further, the methods of the present invention may be used to control any number of sprinklers either individually or in groups. Accordingly, the scope of the present invention should be determined not by the embodiments illustrated, but by the appended claims and their legal equivalents.

What is claimed is:

1. A method for spraying an applicant at a discrete water distribution rate over a given area by an irrigation system, wherein the irrigation system includes a central Pivot Point, a Last Regular Drive Unit (LRDU) and a corner machine which is movable by a Steerable Drive Unit (SDU); wherein the irrigation system comprises a plurality of LRDU sprayers positioned between the Pivot Point and the LRDU; wherein the irrigation system comprises a plurality of corner arm sprayers positioned between the LRDU and the SDU; wherein the method comprises:

determining a corner arm sprinkler flow rate for at least a first corner arm sprinkler; and adjusting a duty cycle of the first corner arm sprinkler;

wherein the total flow rate of the first corner sprinkler is calculated at least in part using the change in flow rate caused by the rotation around the pivot point;

wherein the total flow rate of the first corner sprinkler is calculated at least in part using the change in flow rate caused by the rotation around the LRDU;

wherein the step of determining the flow rate of the first corner sprinkler comprises: determining a SDU Speed Vector;

wherein determining the SDU Speed Vector comprises adding together the linear speed of the SDU due to Rotation Around the Pivot Point (RAPP) and the angular speed of the SDU due to Rotation Around LRDU (RAL).

2. The method of claim 1, wherein the step of determining the flow rate of the first corner sprinkler further comprises: calculating an Overlap Factor.

3. The method of claim 2, wherein the step of determining the flow rate of the first corner sprinkler further comprises: calculating a Sprinkler Location Flow Multiplier (SLFM).

4. The method of claim 1, wherein a total flow rate of the first corner sprinkler is calculated relative to an LRDU flow rate.

5. The method of claim 1, wherein the method further comprises the step of: receiving and storing data selected from a first group of data, wherein the first group of data comprises: SDU GPS location data, pivot point GPS data, irrigation system dimensions and SDU heading data.

6. The method of claim 5, wherein the method further comprises the step of: receiving and storing data from a second group of data, wherein the second group of data comprises: SDU/corner path data, pivot direction data, sprinkler projection distance data and drive tower speeds.

7. The method of claim 1, wherein the method further comprises the step of: calculating initial SDU and LRDU paths based on detected field factors within a first defined area.

8. The method of claim 1, wherein the method further comprises the step of: generating SDU/LRDU path data.

9. The method of claim 7, wherein the detected field factors comprise at least a first field factor selected from the group of field factors comprising: field boundary shape, obstacles, boundaries and bridges.

10. The method of claim 7, wherein the detected field factors comprise at least a first field factor selected from the group of field factors comprising: safety margins, distance to LRDU, corner arm span length, corner overhang length, and a speed ratio between the LRDU and SDU.

11. The method of claim 1, wherein the method further comprises: pre-calculating the SDU and LRDU paths based on the irrigation machine position.

12. The method of claim 1, wherein the method further comprises: adjusting at least one of the pre-calculated SDU and LRDU paths during machine movement.

13. The method of claim 1, wherein the method further comprises: calculating the distance between the SDU from the pivot point.

14. The method of claim 1, wherein the method further comprises: calculating the LRDU location from the SDU Position.

15. The method of claim 1, wherein the method further comprises: determining a target SDU location (SDU') by estimating where the SDU will be at a projected time and distance ahead in the pivot direction.

16. The method of claim 1, wherein the method further comprises: determining a target LRDU location (LRDU') corresponding to the target SDU location (SDU').

17. The method of claim 16, wherein the method further comprises: calculating the LRDU travel time; wherein the LRDU travel time comprises the time required for the LRDU to travel from the current LRDU position to the target LRDU position (LRDU').

18. The method of claim 17, wherein the method further comprises the step of: calculating the angular speed of the SDU from the determined LRDU travel time.

* * * * *